(12) United States Patent
Tian et al.

(10) Patent No.: US 12,007,673 B2
(45) Date of Patent: Jun. 11, 2024

(54) HANDHELD GIMBAL DEVICE

(71) Applicant: SZ DJI TECHNOLOGY CO., LTD., Shenzhen (CN)

(72) Inventors: Xiaoyu Tian, Shenzhen (CN); Zhihui Zhu, Shenzhen (CN); Yanchong Zhao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 1014 days.

(21) Appl. No.: 16/919,902

(22) Filed: Jul. 2, 2020

(65) Prior Publication Data

US 2020/0333693 A1 Oct. 22, 2020

Related U.S. Application Data

(63) Continuation of application No. PCT/CN2018/071680, filed on Jan. 5, 2018.

(51) Int. Cl.
| | |
|---|---|
| *G03B 17/56* | (2021.01) |
| *A45F 5/10* | (2006.01) |
| *F16M 13/04* | (2006.01) |

(52) U.S. Cl.
CPC .............. *G03B 17/561* (2013.01); *A45F 5/10* (2013.01); *F16M 13/04* (2013.01); *A45F 2200/0533* (2013.01); *F16M 2200/041* (2013.01)

(58) Field of Classification Search
CPC .. G03B 17/561; A45F 5/10; A45F 2200/0533; A45F 2200/044; F16M 13/04; F16M 2200/041; F16M 11/043; F16M 11/10; F16M 11/123; F16M 11/16; F16M 11/2071; F16M 11/2085; F16M 11/2092; F16M 11/24; F16M 11/118
See application file for complete search history.

(56) References Cited

U.S. PATENT DOCUMENTS

| | | | | |
|---|---|---|---|---|
| 9,360,740 | B2 * | 6/2016 | Wagner | F16M 11/18 |
| 9,458,936 | B2 * | 10/2016 | Bernett | F16J 15/022 |
| D849,497 | S * | 5/2019 | Wang | D8/71 |
| 10,670,183 | B2 * | 6/2020 | Bin | F16M 11/38 |
| 10,704,732 | B2 * | 7/2020 | Kang | F16M 13/00 |
| 2017/0064176 | A1 | 3/2017 | Kim | |
| 2017/0301230 | A1 | 10/2017 | Liu et al. | |

FOREIGN PATENT DOCUMENTS

| | | |
|---|---|---|
| CN | 203673207 U | 6/2014 |
| CN | 204879354 U | 12/2015 |
| CN | 105744027 A | 7/2016 |
| CN | 205424318 U | 8/2016 |

(Continued)

OTHER PUBLICATIONS

The World Intellectual Property Organization (WIPO) International Search Report for PCT/CN2018/071680 dated Sep. 28, 2018 6 pages.

*Primary Examiner* — Stephen A Vu
(74) *Attorney, Agent, or Firm* — ANOVA LAW GROUP, PLLC

(57) ABSTRACT

A handheld gimbal device includes a gimbal and a gimbal handle connected to the gimbal. The gimbal handle includes a handle body and a hand grip detachably mounted at the handle body. The handle body includes an external interface configured to connect the gimbal with an external device.

20 Claims, 22 Drawing Sheets

(56) References Cited

FOREIGN PATENT DOCUMENTS

| | | | |
|---|---|---|---|
| CN | 106090579 | A | 11/2016 |
| CN | 206221949 | U | 6/2017 |
| CN | 206349432 | U | 7/2017 |
| CN | 107120499 | A | 9/2017 |
| CN | 107255901 | A | 10/2017 |
| CN | 206775572 | U | 12/2017 |
| JP | H04109234 | A | 4/1992 |
| JP | 2005321741 | A | 11/2005 |
| JP | 2007256893 | A | 10/2007 |
| JP | 2011109324 | A | 6/2011 |
| JP | 2016541010 | A | 12/2016 |
| WO | 20150165109 | A1 | 11/2015 |
| WO | 2017116919 | A1 | 7/2017 |

\* cited by examiner

HANDHELD GIMBAL DEVICE

CROSS-REFERENCE TO RELATED APPLICATION

This application is a continuation of International Application No. PCT/CN2018/071680, filed Jan. 5, 2018, the entire content of which is incorporated herein by reference.

TECHNICAL FIELD

The present disclosure relates to a handheld gimbal device.

BACKGROUND

Handheld gimbal is small in size and convenient to carry. It can be installed with a small-sized photographing device, such as a video camera, a camera, or a smartphone. It can quickly and stably control the photographing device to maintain a fixed attitude when shooting while moving. However, the existing handheld gimbals cannot be quickly connected to external devices, such as focus followers, etc., which makes them with only a single function and inconvenient to use.

SUMMARY

In accordance with the disclosure, there is provided a handheld gimbal device including a gimbal and a gimbal handle connected to the gimbal. The gimbal handle includes a handle body and a hand grip detachably mounted at the handle body. The handle body includes an external interface configured to connect the gimbal with an external device.

BRIEF DESCRIPTION OF THE DRAWINGS

To more clearly illustrate the technical solution of the present disclosure, the accompanying drawings used in the description of the disclosed embodiments are briefly described below. The drawings described below are merely some embodiments of the present disclosure. Other drawings may be derived from such drawings by a person with ordinary skill in the art without creative efforts.

DETAILED DESCRIPTION OF THE EMBODIMENTS

Figure 1:
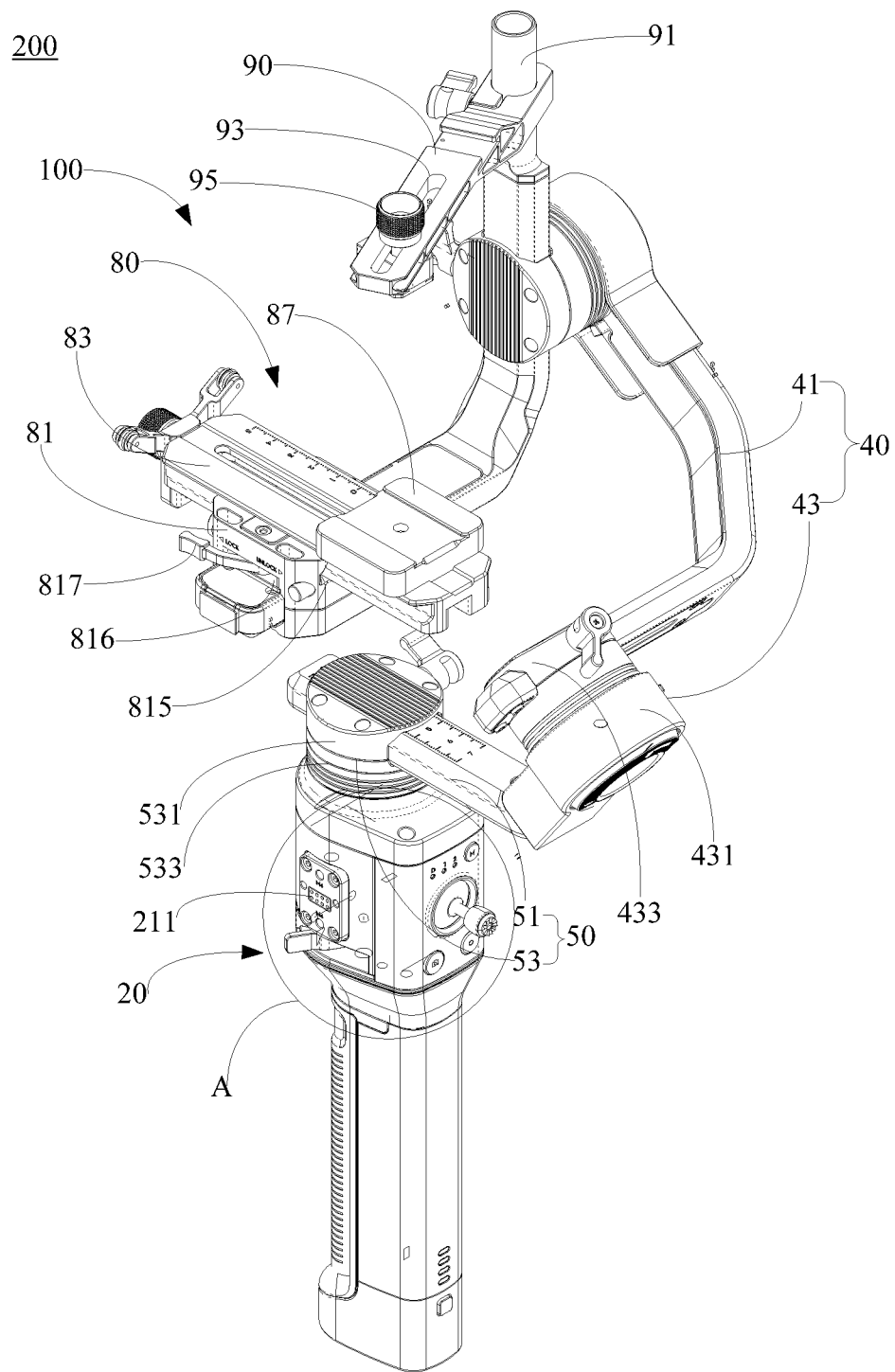
FIG. 1 is a schematic perspective view of a handheld gimbal device according to an embodiment of the disclosure.

The technical solutions in the example embodiments of the present disclosure will be described clearly with reference to the accompanying drawings. The described embodiments are only some of the embodiments of the present disclosure, rather than all the embodiments. Based on the embodiments of the present disclosure, all other embodiments obtained by a person of ordinary skill in the art without creative efforts shall fall within the scope of the present disclosure.

Exemplary embodiments are described in detail here, examples of which are illustrated in the accompanying drawings. When the following description refers to the accompanying drawings, the same numbers in different drawings represent the same or similar elements unless otherwise specified. The implementations described in the following exemplary embodiments do not represent all implementations consistent with this disclosure. Rather, they are merely examples of devices and methods consistent with certain aspects of the disclosure as detailed in the appended claims.

The terminology used in this disclosure is for the purpose of describing particular embodiments only and is not intended to limit the disclosure. As used in this disclosure and the appended claims, the singular forms "a" and "the" are intended to include the plural forms as well, unless the context clearly indicates otherwise. The term "and/or" as used herein refers to and includes any or all possible combinations of one or more of the associated listed items. Unless stated otherwise, similar words such as "front," "rear," "lower" and/or "upper" are merely for convenience of explanation, and are not limited to a position or a spatial orientation. Terms such as "connected" or "connecting" are not limited to physical or mechanical connections, and may include electrical connections, whether direct or indirect.

A handheld gimbal device in the embodiments of the disclosure includes a gimbal and a gimbal handle connected to the gimbal. The gimbal handle includes a handle body and a hand grip. The handle body is provided with an external interface to connect with an external device. The hand grip is detachably mounted at the handle body. The handheld gimbal device includes a gimbal handle connected to the gimbal. The handle body of the gimbal handle is provided with the external interface. The gimbal is connected to external devices through the external interface to expand the functions of the gimbal.

The handheld gimbal device of the present disclosure is described in detail below with reference to the accompanying drawings. In the case of no conflict, the features of the following embodiments and implementations can be combined with each other.

As shown in FIGS. 1 to 4, the disclosure provides a handheld gimbal device 200. The handheld gimbal device 200 includes a gimbal 100 and a gimbal handle 20 connected to the gimbal 100. The gimbal 100 is used to carry a photographing device (not shown in the figure). The photographing device may be a camera, a video camera, a smart phone, or the like. The gimbal handle 20 can be held by the user during shooting.

The gimbal handle 20 includes a handle body 21, a hand grip 22, and a lock mechanism 23. The lock mechanism 23 locks or unlocks the handle body 21 and the hand grip 22 to dissemble and assemble the handle body 21 and the hand grip 22. The handle body 21 is provided with an external interface 211, and the gimbal 100 is connected to an external device through the external interface 211. The hand grip 22 is detachably mounted at the handle body 21. The external device includes at least one of a focus follower, a secondary handle, a U disk, a display screen, or a microphone, but is not limited thereto. In this way, the functions of the gimbal 100 can be extended through the external interface 211 according to specific needs.

An interface module 210 is mounted at the handle body 21, and the external interface 211 is disposed at the interface module 210. Specifically, the handle body 21 is provided with a recess 212, and the interface module 210 is mounted in the recess 212. In this embodiment, the interface module 210 is approximately square and the external interface 211 is disposed at a middle position of the interface module 210. Mounting holes 213 are provided at four corners of the interface module 210. The interface module 210 is fixed in the recess 212 of the handle body 21 with fasteners (not shown in the figure) passing through the mounting holes. In this way, processing and mounting are very convenient. The left and right sides of the external interface 211 are provided with positioning holes 2140, which match the positioning structure of the external device to achieve positioning of the external device. The upper and lower sides of the external interface 211 are provided with fixation holes 220 to fix the external device at the interface module 210 with fasteners passing through the fixation hole 220, which is convenient and reliable.

Figure 21:
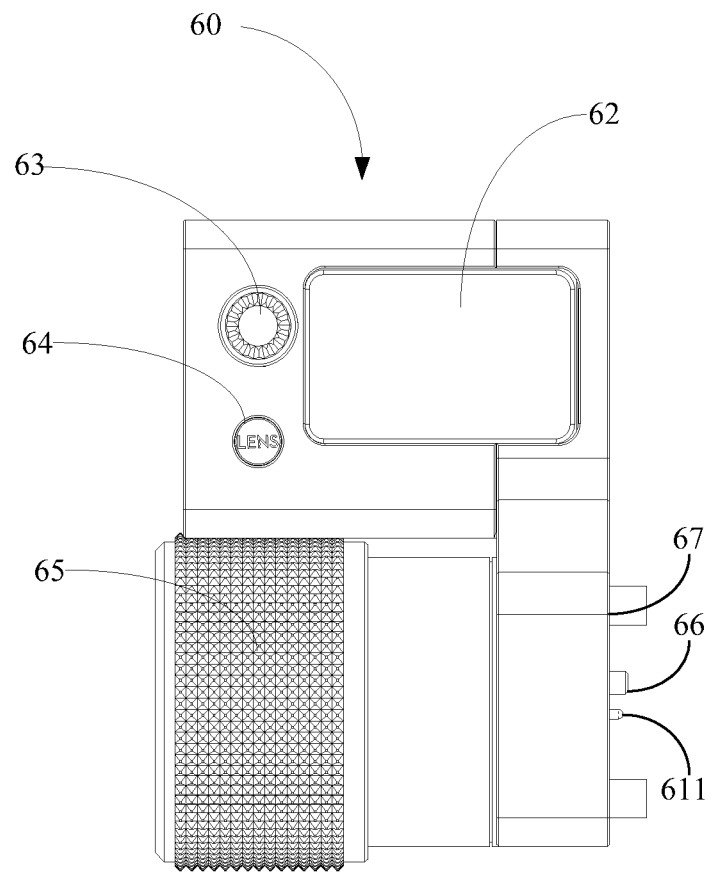
FIG. 21 is a front view of a focus follower of the handheld gimbal device of the disclosure.
Figure 22:
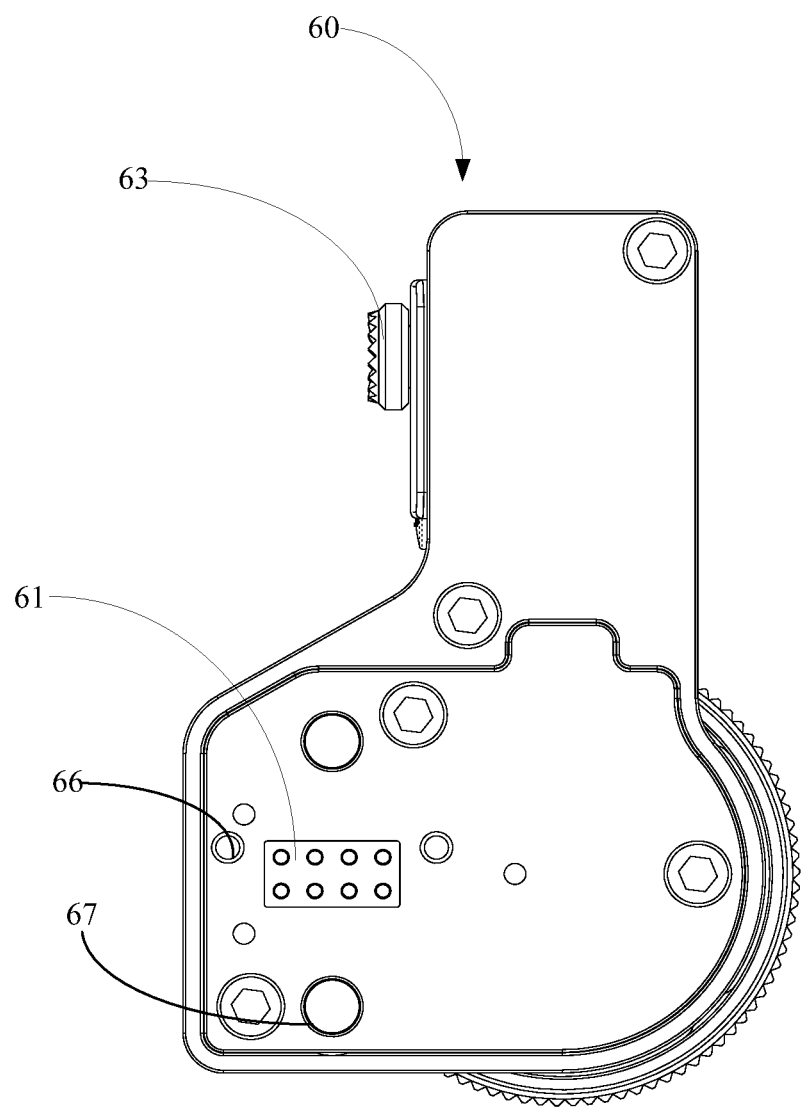
FIG. 22 is a side view of the focus follower shown in FIG. 21.
Figure 23:
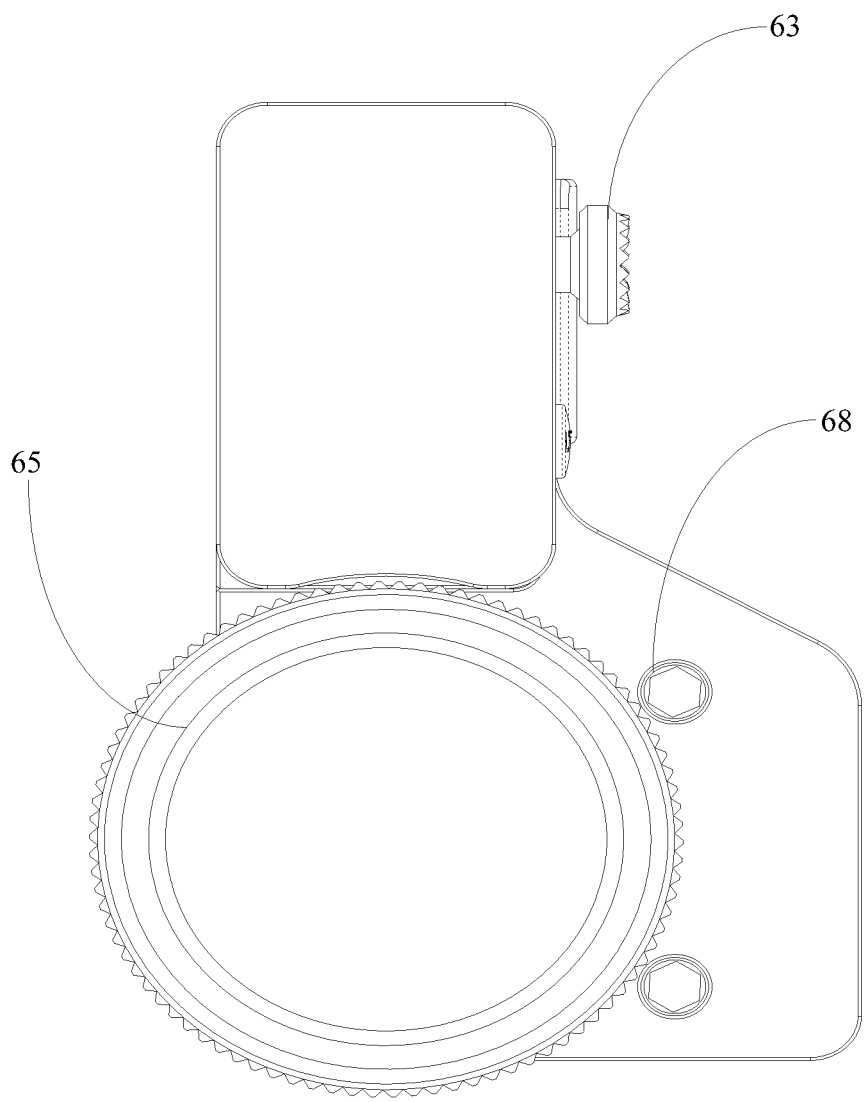
FIG. 23 is another side view of the focus follower shown in FIG. 21.

Referring to FIGS. 21 to 23, in one embodiment, the handheld gimbal device 200 further includes a focus follower 60 to adjust the focus of the photographing device. The focus follower 60 includes a connection interface 61 matching the external interface 211. A plurality of contacts 611 are provided at the connection interface 61. A pair of positioning posts 66 are arranged on the left and right sides of the connection interface 61 to match the positioning holes 2140 at the interface module 210. A pair of through holes 68 are arranged on the upper and lower sides for receiving the fixation post 67. The fixation post 67 is used to fix the focus follower 60 in cooperation with the fixation hole 220 at the interface module 210. In this embodiment, the fixation post 67 is a screw. During installation, the positioning post 66 is first inserted into the positioning hole 2140 to position the focus follower 60, and then the screw is rotated to fix the focus follower 60 at the handle body 21. The focus follower 60 further includes a focus following wheel 65 for quickly adjusting the focus of the photographing device, a display screen 62 for displaying the parameters of the gimbal and a control button 63 for adjusting the parameters of the gimbal 100. The gimbal parameters displayed by the focus follower 60 include speed, strength, working mode, power, or the like. The focus follower 60 further includes a button 64 for mapping lenses of different focal lengths.

The handle body 21 is provided with a mode switching button 216 for switching the working mode of the gimbal 100. The mode switching button 216 is used to receive a user's operation instruction and control the working mode of the gimbal 100 according to the operation instruction. For example, in one embodiment, the gimbal 100 includes, but is not limited to, the following three working modes of a follow mode, a free mode, and a motion mode. The follow mode means that the gimbal 100 adjusts according to the movement of the gimbal handle 20, and the free mode means that the gimbal 100 adjusts according to the movement of the target. The motion mode means the gimbal 100 responses fast. In this embodiment, two mode switching buttons 216 are provided. Pressing one of the mode switching buttons 216 can switch the gimbal 100 among the above three working modes. When the gimbal 100 is in one of the working modes, pressing the other mode switching button 216 can adjust a parameter of the gimbal 100 in this working mode, such as movement speed or rotation angle, etc. In other embodiments, the gimbal 100 may include one, two, or more than three working modes.

The handle body 21 is provided with a status light 2170 that displays the status of the gimbal 100. In the illustrated embodiment, three status lights 2170 are provided, and different statuses of the gimbal 100 can be displayed through the cooperation of the three lights. For example, when the system is normal, one of the status lights 2170 is always on and is green, when the system is abnormal, the three status lights 2170 are always on and red, and when the system is alarming, one of the status lights 2170 is always on and yellow. The number of status lights 2170 can be set according to specific needs.

The handle body 21 is provided with a joystick 27 for operating the gimbal 100. According to the shooting scene and shooting needs, the joystick 27 is operated to control the gimbal 100.

The handle body 21 is further provided with a camera button 2180 and a video camera button 2190. When the gimbal 100 carries a camera, the user performs related operations on the camera through the camera button 2180. When the gimbal 100 carries a video camera, the user performs related operations on the video camera through the video camera button 2190.

The hand grip 22 supplies power to the gimbal 100. In this embodiment, a battery is integrated in the hand grip 22, so that the instability of the battery during assembling/disassembling and use is reduced. The lower end of the handle body 21 is provided with an interface (not shown in the figure) that matches the battery. According to the needs of the specific use scenario, the hand grip 22 can be removed, and through the interface, the gimbal 100 can be mounted in a vehicle use scenario, in a ropeway use scenarios, with a large two-handle handle, and so on, which is not limited to this. Therefore, the functions of the gimbal 100 can be further expanded.

The gimbal 100 includes at least one of a pitch axis mechanism 30, a roll axis mechanism 40, and a yaw axis mechanism 50. That is, the gimbal 100 can be a one-axis gimbal, a two-axis gimbal, or a three-axis gimbal.

In the illustrated embodiment, the gimbal 100 is a three-axis gimbal including the pitch axis mechanism 30, the roll axis mechanism 40, and the yaw axis mechanism 50. The pitch axis mechanism 30, the roll axis mechanism 40, and the yaw axis mechanism 50 are sequentially connected.

The pitch axis mechanism 30 includes a first bracket 31, a first motor 33, and a support device 80 mounted at the first bracket 31. The support device 80 is slidable relative to the first bracket 31. The support device 80 includes a sliding base 81 matching the first bracket 31, a mounting base 83 provided at the sliding base 81, and a lock assembly 85 for locking the sliding base 81 to a predetermined position of the first bracket 31. In this way, the position of the support device 80 at the first bracket 31 can be adjusted according to the size of the photographing device. The sliding base 81 is provided with a channel 811 matching the first bracket 31. The sliding base 81 is slidably mounted at the first bracket 31 through the channel 811.

The lock assembly 85 includes a rotation handle 851 and a lock body (not shown in the figure) connected with the rotation handle 851 through a screw. The lock body is located in the sliding base 81 and matches the first bracket 31. Rotating the rotation handle 851 can press the lock body against the first bracket 31, thereby the support device 80 can be fixed to the first bracket 31. When the position of the support device 80 at the first bracket 31 needs to be adjusted, the rotation handle 851 is rotated in a reverse direction to detach the lock body from the first bracket 31. At this time, the sliding base 81 can slide relative to the first bracket 31.

The mounting base 83 is slidably disposed at the sliding base 81. Specifically, a sliding groove 815 matching the mounting base 83 is provided at the top of the sliding base 81, and the mounting base 83 is slidably disposed at the sliding groove 815. The sliding base 81 is further provided with a receiving groove 816 communicating with the sliding groove 815. The receiving groove 816 is provided with a trigger 817 capable of locking the mounting base 83 at a predetermined position. The trigger 817 is rotatably disposed in the receiving groove 816. One end of the trigger 817 extends out of the receiving groove 816, and the other end is provided with a cam mechanism (not shown in the figure). When the trigger 817 is rotated to a certain position, the cam mechanism presses the sidewall of the mounting base 83 to lock the mounting base 83 tightly. When the trigger 817 is rotated to another position, the cam mechanism is separated from the sidewall of the mounting base 83. At this time, the position of the mounting base 83 can be adjusted by sliding as needed. A shim plate 87 is provided on the mounting base 83, and the photographing device can be fixed at the shim plate 87 by screws, which can prevent the lens of the photographing device from hitting the mounting base 83.

Figure 4:
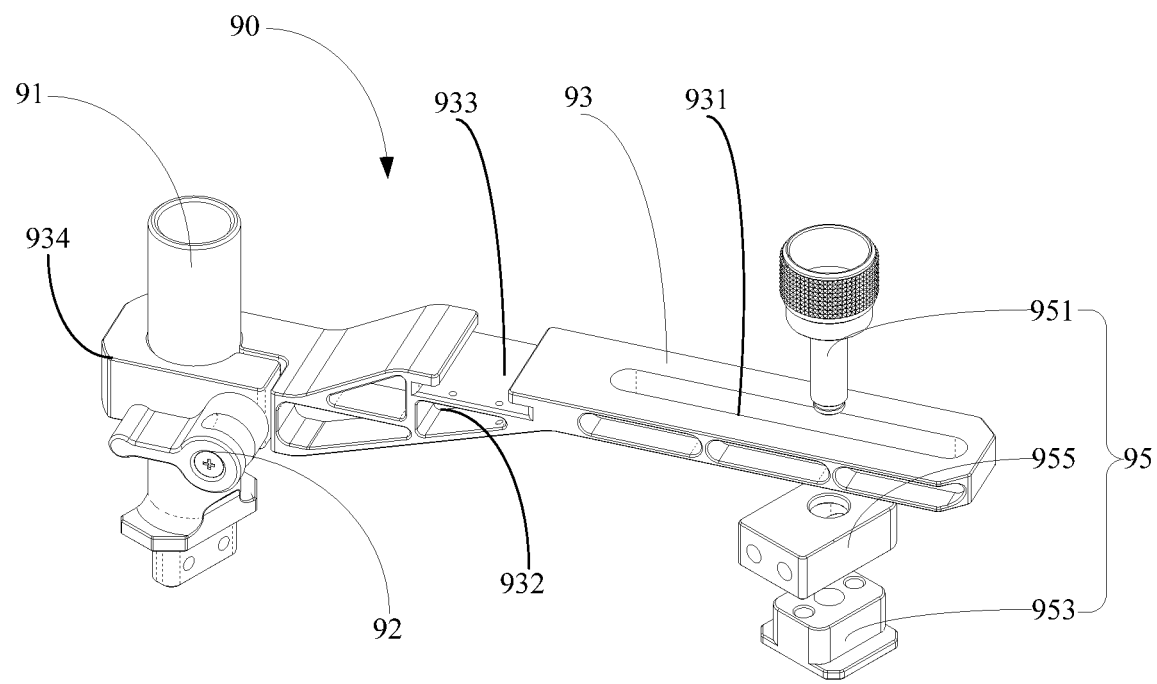
FIG. 4 is a schematic diagram of a fixation mechanism of the handheld gimbal device shown in FIG. 1.

Referring to FIG. 4, the first bracket 31 is further provided with a fixation device 90 corresponding to the support device 80. The fixation device 90 includes a post 91 provided at the first bracket 31, a fixation plate 93 provided at the post 91, and a knob assembly 95 matched with the fixation plate 93. The fixation device 90 fixes the photographing device from above the photographing device, so that the photographing device is more stably and reliably mounted at the gimbal 100, thereby the shot picture is ensured to be more stable and clearer.

Specifically, the knob assembly 95 includes a knob 951, a first clamp member 953 thread fitting with the knob 951, and a second clamp member 955 matching the first clamp member 953. When the photographing device is mounted at the gimbal, the metal convex edge of the hot shoe of the photographing device is located between the first clamp member 953 and the second clamp member 955, and then the knob 951 is rotated so that the first clamp member 953 moves towards the second clamp member 955. Thereby, the metal convex edge of the hot shoe is clamped between the first clamp member 953 and the second clamp member 955.

The fixation plate 93 is provided with a longitudinal groove 931. The longitudinal groove 931 is set along the long side of the fixation plate 93, and the knob assembly 95 can slide in the longitudinal groove 931, so as to adjust the position of the knob assembly 95 based on the position of the photographing device. The fixation plate 93 is made of aluminum alloy, and the fixation plate 93 is further provided with a through hole 932 to achieve the effect of weight reduction. In addition, a cold shoe structure 933 is also provided at the fixation plate 93, and some standard accessories, such as a microphone and a supplementing light, can be installed according to specific needs.

The fixation plate 93 is locked to the post 91 by a lock mechanism 92. Specifically, the fixation plate 93 includes a mounting portion 934, which surrounds the post 91. There is a certain gap between two matching ends of the mounting portion 934. The lock mechanism 92 passes through the two matching ends. When the lock mechanism 92 is operated, the two matching ends are moved towards each other and the fixation plate 93 is locked to the post 91. By operating the lock mechanism 92 in the reverse direction, the fixation plate 93 can be released from the post 91, so that the height of the fixation plate 93 can be adjusted according to the height of the photographing device. The operation is easy, and the applicability is strong.

The first motor 33 includes a first stator 331 and a first rotor 333. The first bracket 31 is connected to the first rotor 333. The first rotor 333 is slidably disposed at the first bracket 31, and the first rotor 333 can be fixed to the first bracket 31 through a first lock mechanism 34.

The roll axis mechanism 40 includes a second bracket 41 and a second motor 43. The second motor 43 includes a second stator 431 and a second rotor 433. One end of the second bracket 41 is connected to the first stator 331 of the first motor 33 and the other end is connected to the second rotor 433 of the second motor 43. The second rotor 433 is slidably disposed at the second bracket 41, and the second rotor 433 is fixed to the second bracket 41 through a second lock mechanism 44.

The yaw axis mechanism 50 includes a third bracket 51 and a third motor 53. The third motor 53 includes a third stator 531 and a third rotor 533. One end of the third bracket 51 is connected to the second stator 431 of the second motor 43, and the other end is connected to the third rotor 533 of the third motor 53. The third rotor 533 is slidably disposed at the third bracket 51, and the third rotor 533 is fixed to the third bracket 51 through a third lock mechanism 54.

The included angle between the axis of the second motor 43 and the axis of the third motor 53 is less than 90 degrees. In the illustrated embodiment, the second bracket 41 is inclined obliquely downward at an angle, so that the axis of the second motor 43 is inclined. This non-orthogonal arrangement allows the second bracket of the gimbal 100 to avoid the monitoring screen of the photographing device, which does not block the user's view during use.

In this embodiment, an included angle between the axis of the second motor 43 and the axis of the third motor 53 includes 55 degrees. Of course, in other embodiments, the included angle between the axis of the second motor 43 and the axis of the third motor 53 can be 50 degrees, 51 degrees, 52 degrees, 53 degrees, 54 degrees, 56 degrees, 57 degrees, 58 Degrees, 59 degrees, 60 degrees, etc., which is not limited here and can be set according to specific needs.

The gimbal handle supporting the gimbal 100 described above has two embodiments, and the specific structures of the two embodiments are described separately below.

Figure 5:
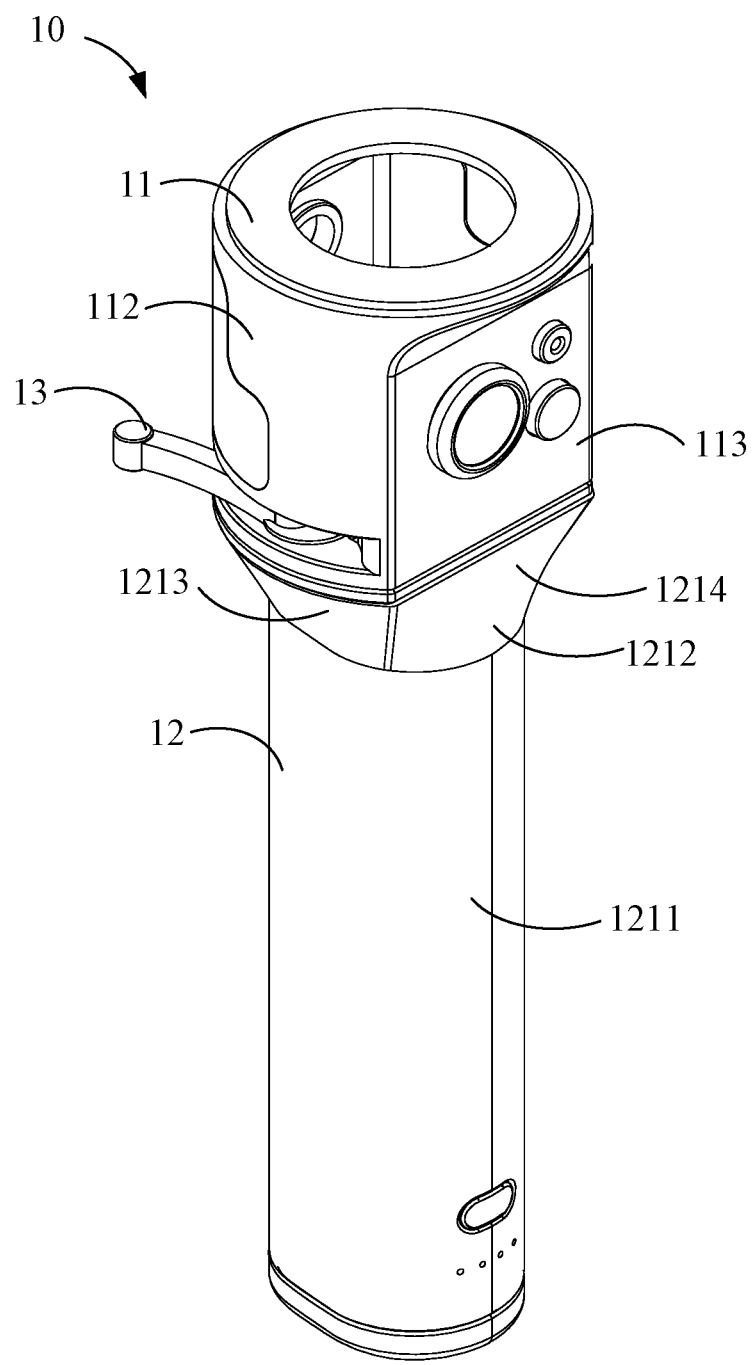
FIG. 5 is a schematic perspective view of a gimbal handle according to an embodiment of the disclosure, where a handle body and a hand grip of the gimbal handle are assembled together.
Figure 6:
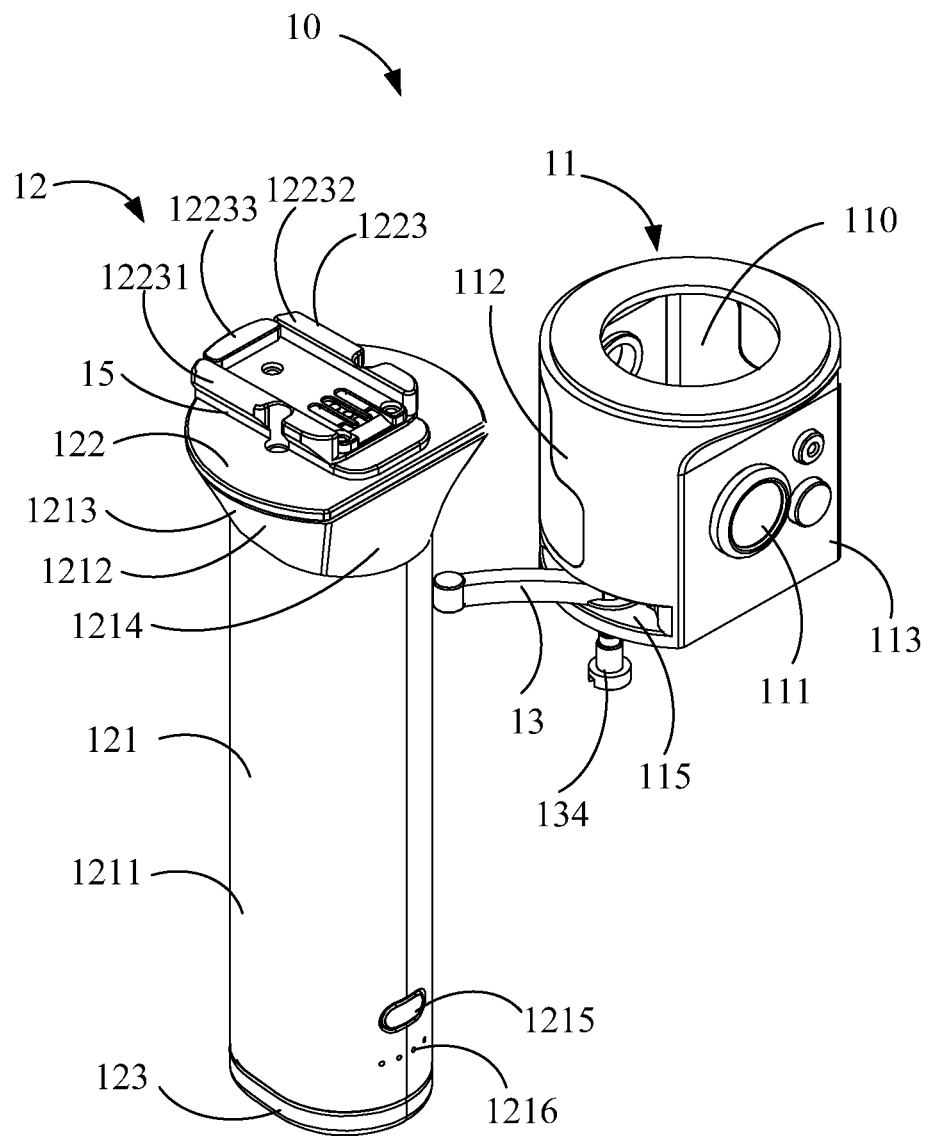
FIG. 6 is another perspective view of the gimbal handle shown in FIG. 5, where the handle body and the hand grip of the gimbal handle are separated.

FIGS. 5 and 6 show an example gimbal handle 10 consistent with the disclosure. As shown in FIGS. 5 and 6, the cross section of the top of a handle body 11 is circular, which is used to connect with the bottom end of the gimbal. The lower part of the handle body 11 is obtained by longitudinally cutting a part off a cylinder and includes a circular arch-shaped side surface 112 and a flat side surface 113 connected to the circular arch-shaped side surface 112. An operation member 111 may be provided at the flat side surface 113. In other embodiments, the handle body 11 may have other shapes.

A hand grip 12 can be held by a user. A battery (not shown in the figure) can be stored in the hand grip 12 to provide power to the gimbal. In the illustrated embodiment, the hand grip 12 includes a battery compartment 121 and an upper cover 122 disposed over the battery compartment 121. The top of the battery compartment 121 has an opening, and the upper cover 122 covers the opening at the top of the battery compartment 121. A battery can be disposed in the battery compartment 121. In some embodiments, the battery may include a multi-cell cylindrical battery that is detachably mounted at the battery compartment 121. In the illustrated embodiment, the bottom of the battery compartment 121 has an opening, and the hand grip 12 includes a bottom cover 123 disposed at the opening of the bottom of the battery compartment 121. The battery can be loaded from the bottom opening of the battery compartment 121. In another embodiment, the battery compartment 121 has a side opening, and a battery can be loaded from the side opening. In other embodiments, a battery cell is integrated in the hand grip 12. The hand grip 12 is used as a holding structure for the user to hold and provides power to the gimbal as a battery. When the gimbal needs to replace the battery, the hand grip 12 can be removed directly from the handle body 11 for a replacement.

In the illustrated embodiment, the battery compartment 121 includes a compartment main body 1211 and a connection portion 1212 provided at a top end of the compartment main body 1211. A battery is disposed in the compartment main body 1211, and a bottom cover 123 is disposed at the bottom of the compartment main body 1211. In one embodiment, the compartment main body 1211 is approximately in the shape of a flat rod, and its cross section may be a shape with multiple arcs connected together with smooth transition connections. In other embodiments, the compartment main body 1211 may be another shape that is suitable for ergonomic use and easy to grasp. The length of the compartment main body 1211 can be set longer, which is convenient for grasping with both hands. A button 1215 and an indicator light 1216 can be provided at the side of the compartment main body 1211. The button 1215 is located at the lower part of the compartment main body 1211 and can be used to switch the battery on and off. The indicator light 1216 can be located at the lower part of the compartment main body 1211 to display the battery status. The indicator light 1216 may be disposed below or above the button 1215.

The top surface of the connection portion 1212 is mounted with the upper cover 122. In the illustrated embodiment, the connection portion 1212 has a shape that gradually reduces inward from the top to the bottom, which can be beneficial to holding and supporting. In the illustrated embodiment, the connection portion 1212 includes an arc-shaped side surface 1213 and an inclined side surface 1214 connected to the arc-shaped side surface 1213. In the illustrated embodiment, the upper portion of the inclined side surface 1214 is substantially flat, and the lower portion has a certain arc and is connected to the top edge of the compartment main body 1211. The radian of the arc-shaped side surface 1213 is larger than the radian of the inclined side surface 1214. The arc-shaped side surface 1213 and the inclined side surface 1214 can have fillet transition between them to form a rounded side surface. The outer contour of the top surface of the connection portion 1212 is consistent with the outer contour of the bottom surface of the handle body 11. The arc-shaped side surface 1213 of the connection portion 1212 is connected with the circular arch-shaped side surface 112 of the handle body 11, and the inclined side surface 1214 of the connection portion 1212 is connected with the flat side surface 113 of the handle body 11.

The connection portion 1212 may be integrally formed with the compartment main body 1211. The outside of the connection portion 1212 can be covered with grip tape. The grip tape can cover the connection portion 1212 in a full circle for improving the grip feeling. The grip tape may include soft rubber materials such as silicone, rubber, and the like.

Figure 7:
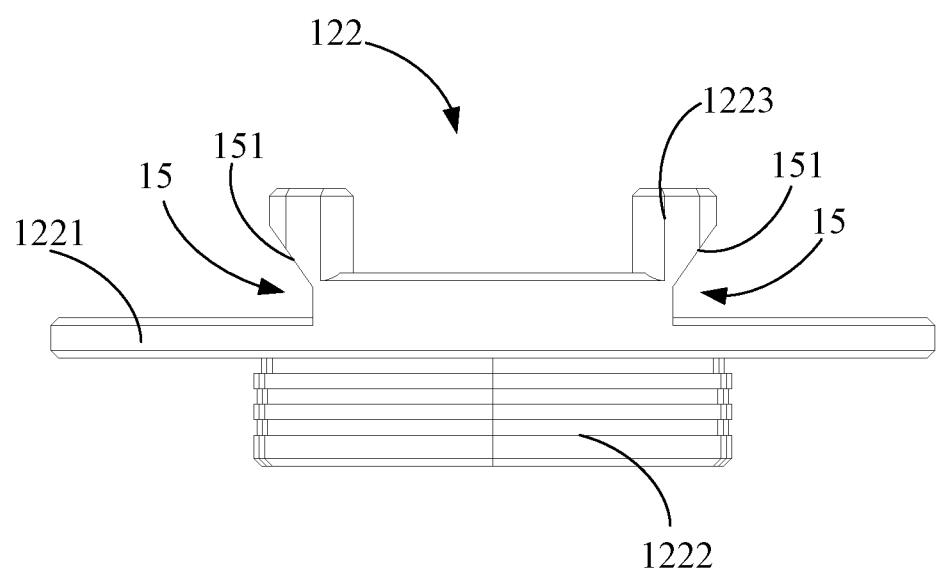
FIG. 7 is a side view of an upper cover of the hand grip shown in FIG. 6.

FIG. 7 is a side view of the upper cover 122 from the side of the inclined side surface 1214 of the connection portion 1212. With reference to FIG. 7, the upper cover 122 includes a cover plate 1221 and a mounting portion 1222 protruding downward from the bottom surface of the cover plate 1221. The cover plate 1221 covers the top surface of the battery compartment 121. The mounting portion 1222 can be clamped in the opening on the top of the battery compartment 121. In the illustrated embodiment, the mounting portion 1222 includes a plastic groove and is connected to the opening of the battery compartment 121 in a sealed manner. In another embodiment, a seal ring is provided at the outer side of the mounting portion 1222 to be connected to the opening of the battery compartment 121 in a sealed manner.

In the illustrated embodiment, the upper cover 122 includes a protrusion 1223 protruding upward from the top surface of the cover plate 1221. In one embodiment, the protrusion 1223 includes a left section 12231 and a right section 12232 both extending from the rear side of the upper cover 122 (that is, the side opposite to the inclined side surface 1214 of the connection portion 1212) to the front side. The left section 12231 and the right section 12232 of the protrusion 1223 are symmetrically disposed with respect to the axis of the cover plate 1221 and are approximately located at a middle position between the left and right sides of the cover plate 1221. In the illustrated embodiment, the protrusion 1223 further includes a rear section 12233 extending between the left section 12231 and the right section 12232 and close to the rear edge of the cover plate 1221. The protrusion 1223 surrounds a rectangular frame opened on one side, which is the side facing the inclined side surface 1214 of the connection portion 1212.

Figure 8:
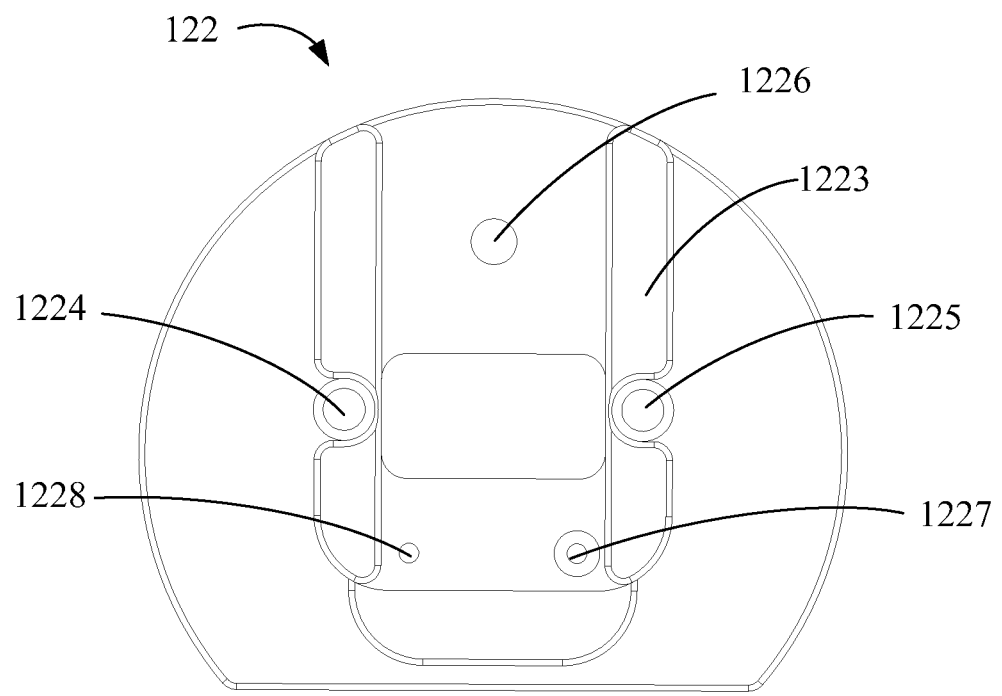
FIG. 8 is a top view of the upper cover shown in FIG. 6.

FIG. 8 is a top view of the upper cover 122. With reference to FIG. 8, the outer contour of the upper cover 122 is consistent with the outer contour of the top surface of the connection portion 1212. In the illustrated embodiment, a plurality of thread holes 1224-1228 are provided at the upper cover 122. The upper cover 122 can be fixed to the battery compartment 121 with screws screwing into the thread holes 1224 and 1225. In one embodiment, the thread holes 1224 and 1225 are disposed symmetrically with respect to the axis of the upper cover 122. The thread holes 1224 and 1225 pass through the protrusion 1223. In other embodiments, the upper cover 122 may be fixed to the battery compartment 121 by other methods.

Figure 9:
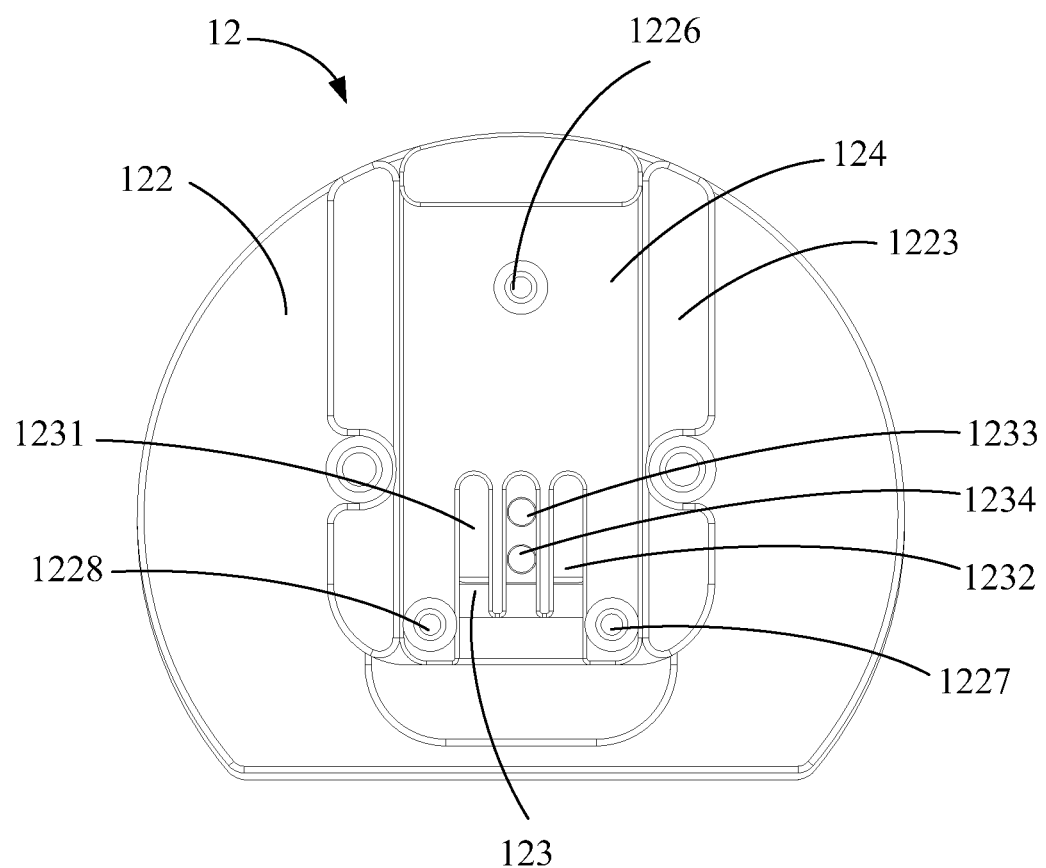
FIG. 9 is a top view of the hand grip shown in FIG. 6.

FIG. 9 is a top view of the hand grip 12. The hand grip 12 includes a contact plate 123 mounted at the top surface of the upper cover 122 and a protection plate 124 attached to the contact plate 123. In the illustrated embodiment, the contact plate 123 and the protection plate 124 can be fixed to the upper cover 122 with screws screwing into the thread holes 1226-1228 of the upper cover 122. In other embodiments, the contact plate 123 and the protection plate 124 may be fixed to the upper cover 122 by other methods. The protrusion 1223 of the upper cover 122 is protruded outside the contact plate 123 and the protection plate 124. In the illustrated embodiment, the protrusion 1223 are protruded from the rear side, the left and right sides of the contact plate 123 and the protection plate 124.

The contact plate 123 may be electrically connected to the battery and serves as an electrical signal interface. The contact plate 123 includes electrode contacts 1231 and 1232, which are electrically connected to the battery and the handle body 11 and can be electrically connected to the gimbal through the handle body 11 so that the battery is electrically connected to the gimbal. The contact plate 123 includes signal contacts 1233 and 1234 for transmitting signals and communicating with the handle body 11.

The protection plate 124 is fixed to the contact plate 123 to protect the contact plate 123, and expose the electrode contacts 1231, 1232 and the signal contacts 1233, 1234 of the contact plate 123. So that the handle body 11 can be electrically connected.

Figure 2:
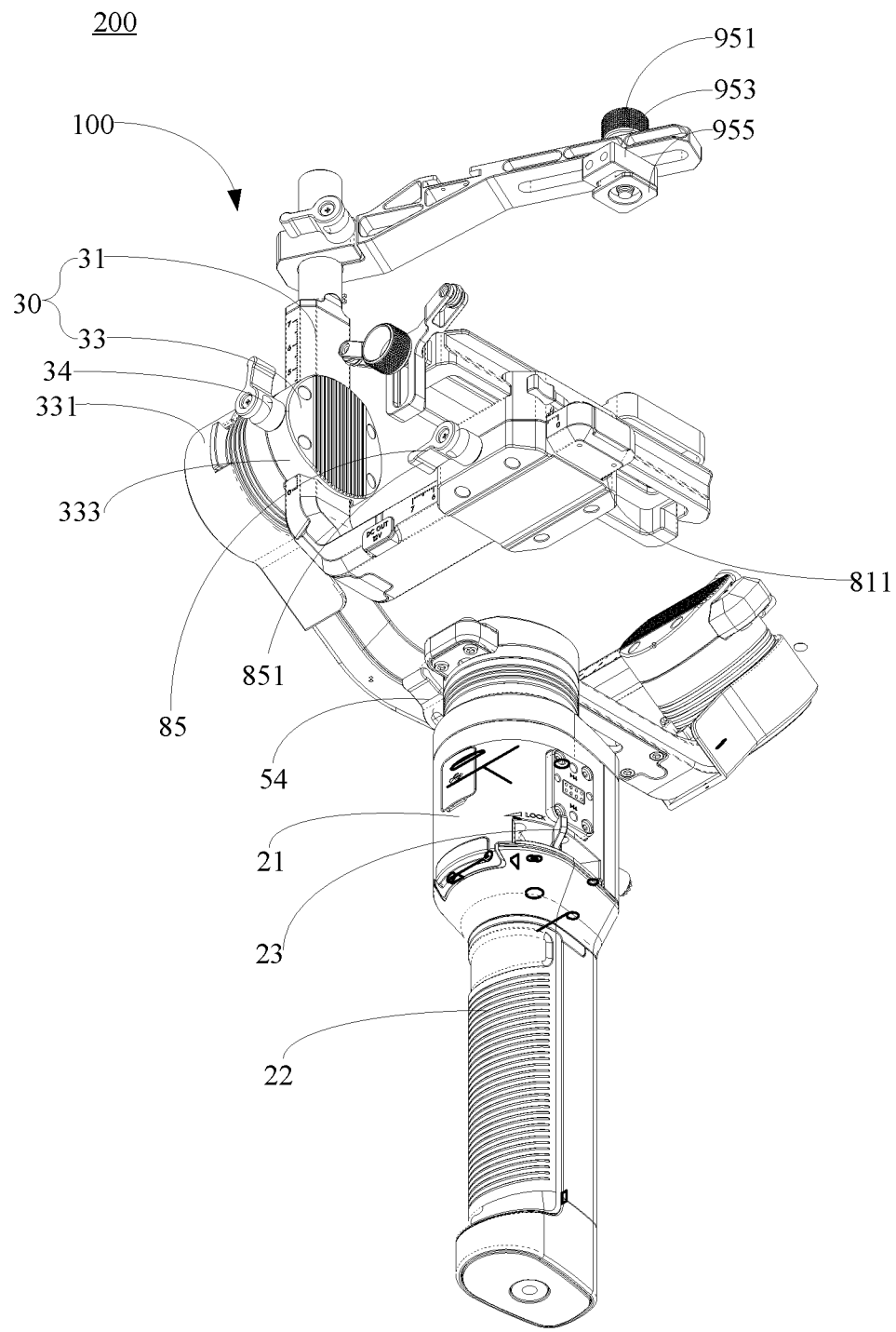
FIG. 2 is a schematic perspective view of the handheld gimbal device shown in FIG. 1 from another perspective.
Figure 3:
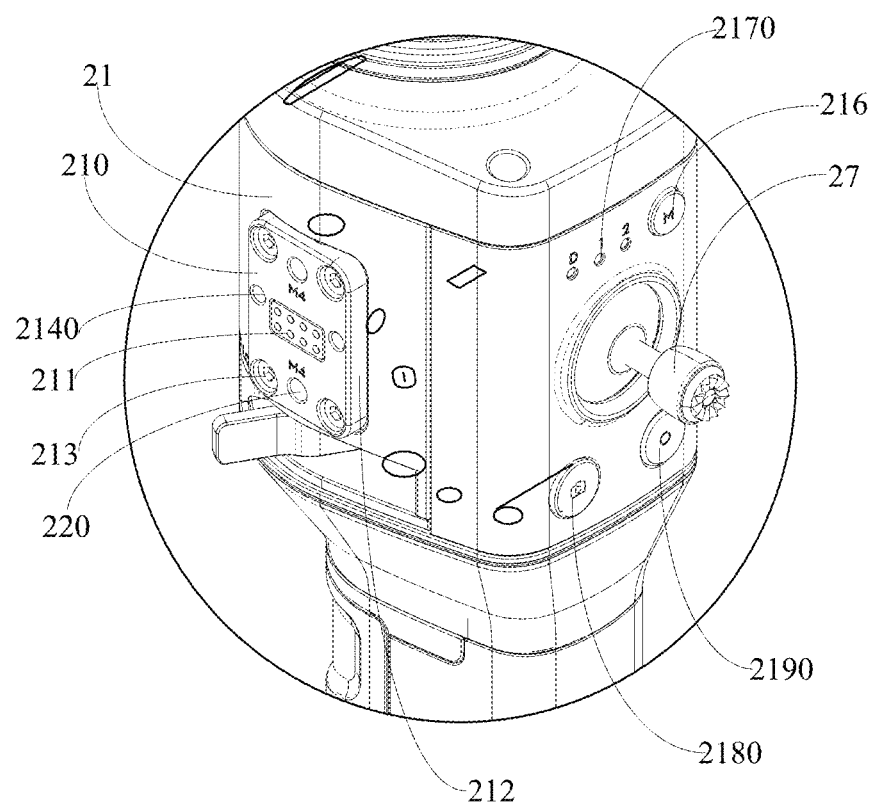
FIG. 3 is an enlarged schematic view of area A of the handheld gimbal device shown in FIG. 1.

A slot 15 is formed at one of the handle body 11 and the hand grip 12. The slot 15 has a first abutment wall 151 extending obliquely with respect to the bottom surface of the slot 15. A lock mechanism 13 is disposed at the other one of the handle body 11 and the hand grip 12 and extends into the slot 15. Referring to FIGS. 1-3, in the illustrated embodiment, the slot 15 is formed at the top of the hand grip 12, and the slot 15 has a first abutment wall 151. The slot 15 is formed at the upper cover 122 of the hand grip 12. The slot 15 may be symmetrically disposed with respect to the axis of the upper cover 122. At least a part of the slot 15 extends from the rear side to the front side of the upper cover 122.

In the illustrated embodiment, the slot 15 is formed inwardly from the outside of the protrusion 1223 of the upper cover 122. The slot 15 opens outwards. In one embodiment, the slot 15 is formed at the left section 12231 and the right section 12232 of the protrusion 1223 and extends along the extending direction of the left section 12231 and the right section 12232 of the protrusion 1223. In one embodiment, a slot 15 can also be formed at the rear section 12233 of the protrusion 1223. In the illustrated embodiment, the top surface of the slot 15 extends obliquely from the top to the bottom and from the outside to the inside and forms the first abutment wall 151. The bottom surface of the slot 15 is the top surface of the cover plate 1221 of the upper cover 122. The first abutment wall 151 is inclined to the top surface of the cover plate 1221.

Figure 10:
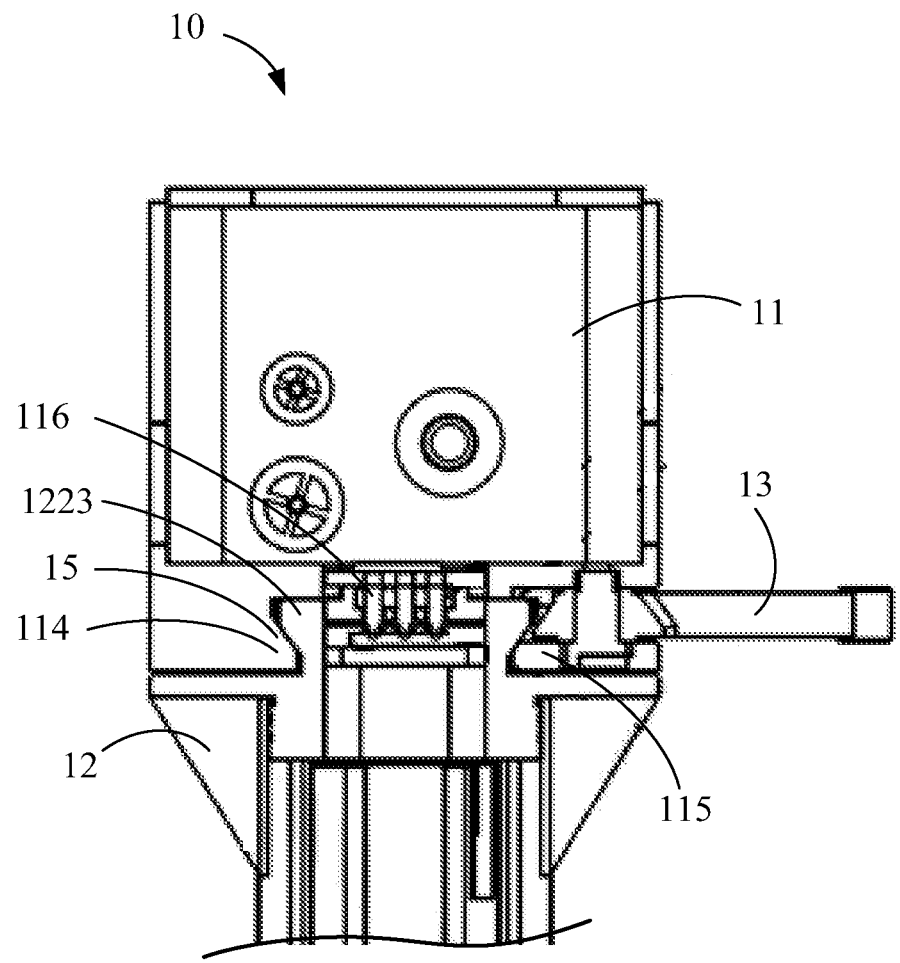
FIG. 10 is a partial longitudinal sectional view of the gimbal handle shown in FIG. 5.

In the illustrated embodiment, the lock mechanism 13 is mounted at the handle body 11 and at least partially reaches into the slot 15 when the handle body 11 and the hand grip 12 assembly together. FIG. 10 is a partial longitudinal sectional view of the gimbal handle 10. With reference to FIG. 10, the bottom of the handle body 11 is provided with an engagement portion 114 that matches with the slot 15, and the engagement portion 114 is inserted in the slot 15. The engagement portion 114 has an inclined sidewall and can abut against the first abutment wall 151 of the slot 15. In the illustrated embodiment, the engagement portion 114 extends laterally and inwardly from the bottom of the handle body 11 to match with the outwardly opening slot 15. The engagement portion 114 and the protrusion 1223 can abut against each other, and the engagement portion 114 can abut against the protrusion 1223 inward and upward. In the illustrated embodiment, the slot 15 is a dovetail slot, and the engagement portion 114 is dovetail shaped.

An operation groove 115 is provided at the bottom of the handle body 11, and the operation groove 115 extends forward and backward along the sidewall of the handle body 11. The lock mechanism 13 at least partially reaches into the operation groove 115 to match with the slot 15 and can move in the operation groove 115.

In another embodiment, the slot 15 is formed at the bottom of the handle body 11, and the lock mechanism 13 is mounted at the top of the hand grip 12. The engagement portion 114 is formed at the top of the hand grip 12 and matches with the slot 15.

Figure 11:
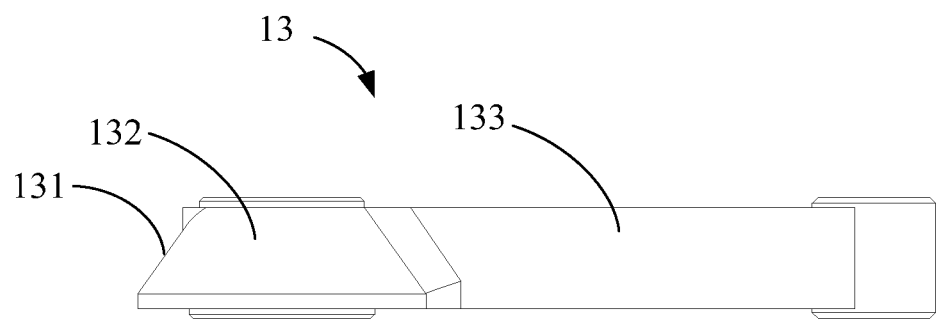
FIG. 11 is a side view of a lock mechanism of the gimbal handle shown in FIG. 5.

FIG. 11 shows a side view of a lock mechanism 17. Referring to FIG. 11, the lock mechanism 13 includes a second abutment wall 131 that extends obliquely with respect to the bottom surface of the slot 15. The lock mechanism 13 moves relative to the slot 15 to make the first abutment wall 151 abut against or separate from the second abutment wall 131. When the second abutment wall 131 abuts against the first abutment wall 151, the engagement portion 114 abuts against the slot 15, thereby the handle body 11 and the hand grip 12 are locked. When the second abutment wall 131 is separated from the first abutment wall 151, the engagement portion 114 and the slot 15 are released, so that the handle body 11 and the hand grip 12 are loosened, and the handle body 11 and the hand grip 12 can be detached. In the illustrated embodiment, the lock mechanism 13 rotates relative to the slot 15 to move the second abutment wall 131 relative to the first abutment wall 151 to abut against or separate from the first abutment wall 151.

Figure 12:
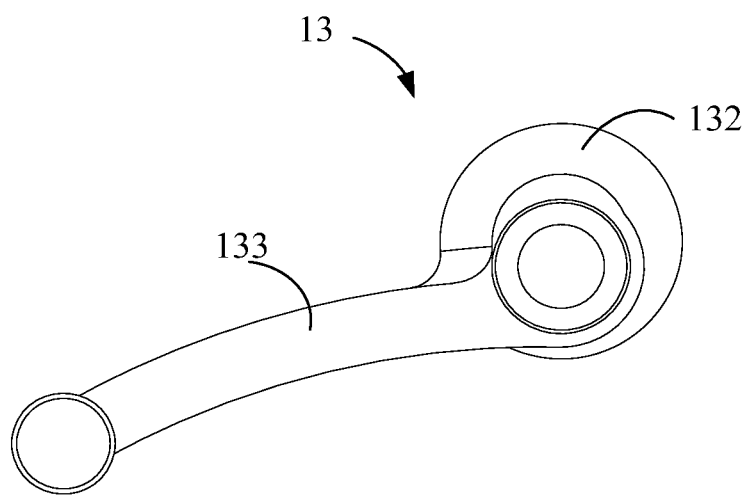
FIG. 12 is a top view of the lock mechanism of the gimbal handle shown in FIG. 5.

FIG. 12 is a top view of the lock mechanism 13. With reference to FIG. 12, the lock mechanism 13 includes a lock cam 132 and a wrench 133 connected to the lock cam 132, and the second abutment wall 131 is at least a part of a sidewall of the lock cam 132. In the illustrated embodiment, the lock cam 132 includes an eccentric wheel. The sidewall of the eccentric wheel extends obliquely with respect to the bottom surface of the eccentric wheel. In the illustrated embodiment, the sidewall of the eccentric wheel gradually slopes outward from top to bottom, and the eccentric wheel gradually expands from top to bottom. In the illustrated embodiment, the lock cam 132 is substantially in a cone shape, and the angle of slope of the sidewall is constant. In one embodiment, the second abutment wall 131 has at least one slope consistent with the slope of the first abutment wall 151. In the illustrated embodiment, the slope of the sidewall of the lock cam 132 is consistent with the slope of the first abutment wall 151.

In another embodiment, the lock cam 132 includes an eccentric wheel, and the slope angle of the sidewall of the eccentric wheel is not constant. At least one slope of the protruding side of the eccentric wheel is consistent with the slope of the first abutment wall 151 and can abut against the first abutment wall 151.

In another embodiment, the lock cam 132 includes an eccentric wheel. A compression block is disposed at the side of the eccentric wheel, and the compression block has a second abutment wall 131. The eccentric wheel can be a substantially cylindrical eccentric wheel, and its sidewall can be perpendicular to its bottom surface. The compression block may be disposed at a protruding side of the eccentric wheel.

In another embodiment, the lock cam 132 includes a non-eccentric cam, and the slope angle of the sidewall of the non-eccentric cam is not constant. The portion of the non-eccentric cam with a larger slope may abut against the first abutment wall 151. In other embodiments, the lock cam 132 may include a slope cam with a variable slope, for example, an involute tapered cam, or another cam having an asymmetric shape.

The wrench 133 protrudes out of the handle body 11, and the lock cam 132 can be rotated by moving the wrench 133. The wrench 133 protrudes out of the handle body 11 from the operation groove 115 of the handle body 11 for operation by a user. In the illustrated embodiment, the wrench 133 has a certain radian. In other embodiments, the wrench 133 may be a straight handle. When the lock mechanism 13 is locked, the wrench 133 extends toward the rear side of the handle body 11 as shown in FIG. 5, and the portion of the wrench 133 protruding from the handle body 11 is relatively short. When the wrench 133 is turned forward, the lock mechanism 13 can be released.

The lock mechanism 13 includes a shaft member 134. As shown in FIG. 6, the shaft member 134 passes through the lock cam 132 and attaches the lock cam 132 to one of the handle body 11 and the hand grip 12, so that the lock cam 132 can rotate around the shaft in the operation groove 115. In the illustrated embodiment, the lock cam 132 and the wrench 133 are rotatably mounted at the handle body 11 through the shaft member 134. In one embodiment, the shaft member 134 may include a bolt.

Referring to FIGS. 5-10, in the illustrated embodiment, when assembling the handle body 11 and the hand grip 12, the lock mechanism 13 is rotated counterclockwise, and then the top of the hand grip 12 and the bottom of the handle body 11 are mated, so that the engagement portion 114 can be inserted into the slot 15 from the back to the front. An elastic conductive terminal 116 (as shown in FIG. 10) at the bottom of the handle body 11 slides relative to the protection plate 124 on the upper cover 122 of the hand grip 12 and is compressed until it contacts the corresponding contacts 1231-1234 at the contact plate 123 after sliding into the position. After that, the wrench 133 is turned clockwise, that is, the wrench 133 is turned toward the rear side of the handle body 11 to rotate the lock cam 132 clockwise, and the second abutment wall 131 of the lock cam 132 continuously moves close to the first abutment wall 151 of the slot 15 until the second abutment wall 131 abuts against the first abutment wall 151, so as to compress the engagement portion 114 into the slot 15, thereby the handle body 11 and the hand grip 12 are locked. At this time, the compressing position of the lock cam 132 passes the dead point of the lock cam 132 to realize reverse self-locking.

When disassembling the handle body 11 and the hand grip 12, the lock mechanism 13 is rotated counterclockwise to move the second abutment wall 131 away from the first abutment wall 151, and the lock cam 132 is no longer pressed against the slot 15. The engagement portion 114 is loosened from the slot 15, and then the engagement portion 114 can be slid out along the slot 15. The elastic conductive terminal 116 at the bottom of the handle body 11 slides relative to the contact plate 123 and the protection plate 124 at the upper cover 122 of the hand grip 12, and is displaced from the contacts 1231-1234 at the contact plate 123 to disconnect the circuit. In this way, the handle body 11 and the grip 12 are separated.

The hand grip 12 and the handle body 11 can be assembled and disassembled quickly and easily by turning the lock mechanism 13. The hand grip 12 is detached from the handle body 11 for easy storage and better portability. In addition, the battery can be easily replaced to meet the needs of long-term shooting. Furthermore, after the hand grip 12 is detached from the handle body 11, the handle body 11 can remain the connection to the gimbal, and a control chip of the handle body 11 can still control the gimbal to operate when external power is supplied. The hand grip 12 can be made relatively long, and the overall length is greatly shortened after disassembly. Therefore, both portability and grip comfort are taken into account and the user is able to hold it with both hands. In addition, the lock mechanism is reliable in connection, can be self-locking, has no absent position, is conducive to shooting quality, and does not limit the overall shape of the gimbal handle 10. Moreover, the lock mechanism 13 has fewer parts and is simple to make, therefore the cost advantage is obvious.

Figure 13:
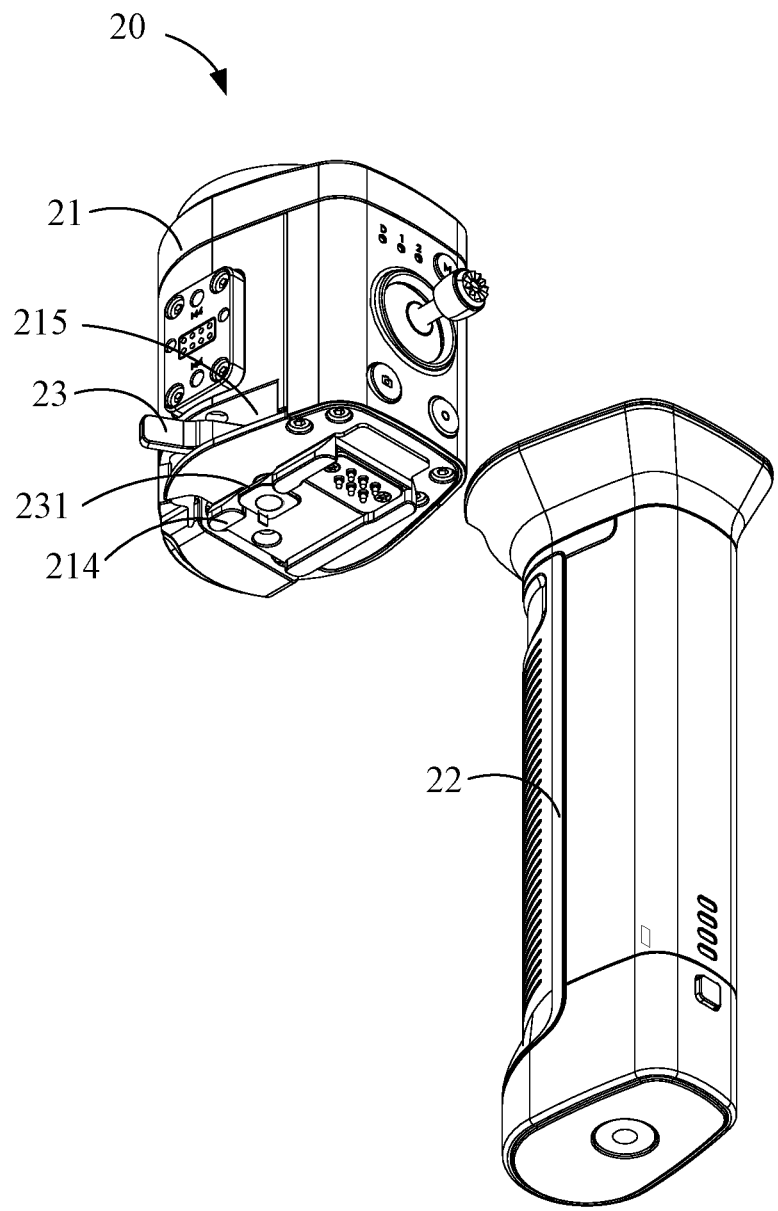
FIG. 13 is a schematic perspective view of a gimbal handle according to another embodiment of the disclosure.
Figure 14:
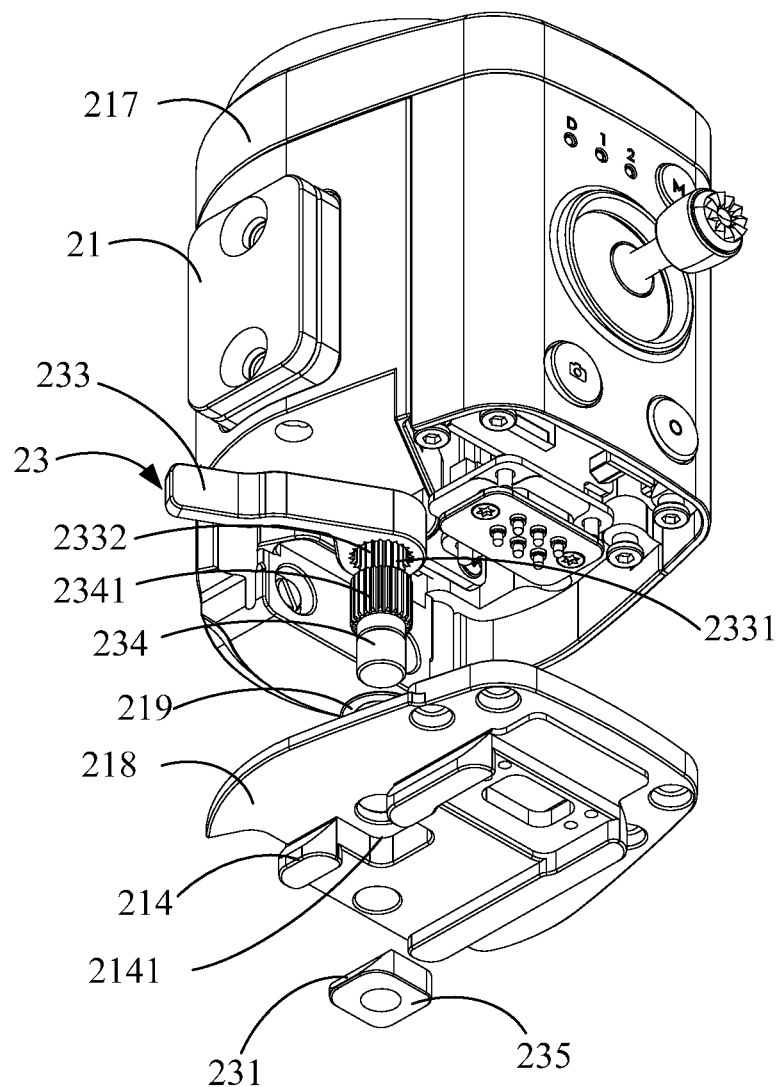
FIG. 14 is an exploded perspective view of a handle body and a lock mechanism of the gimbal handle shown in FIG. 13.
Figure 15:
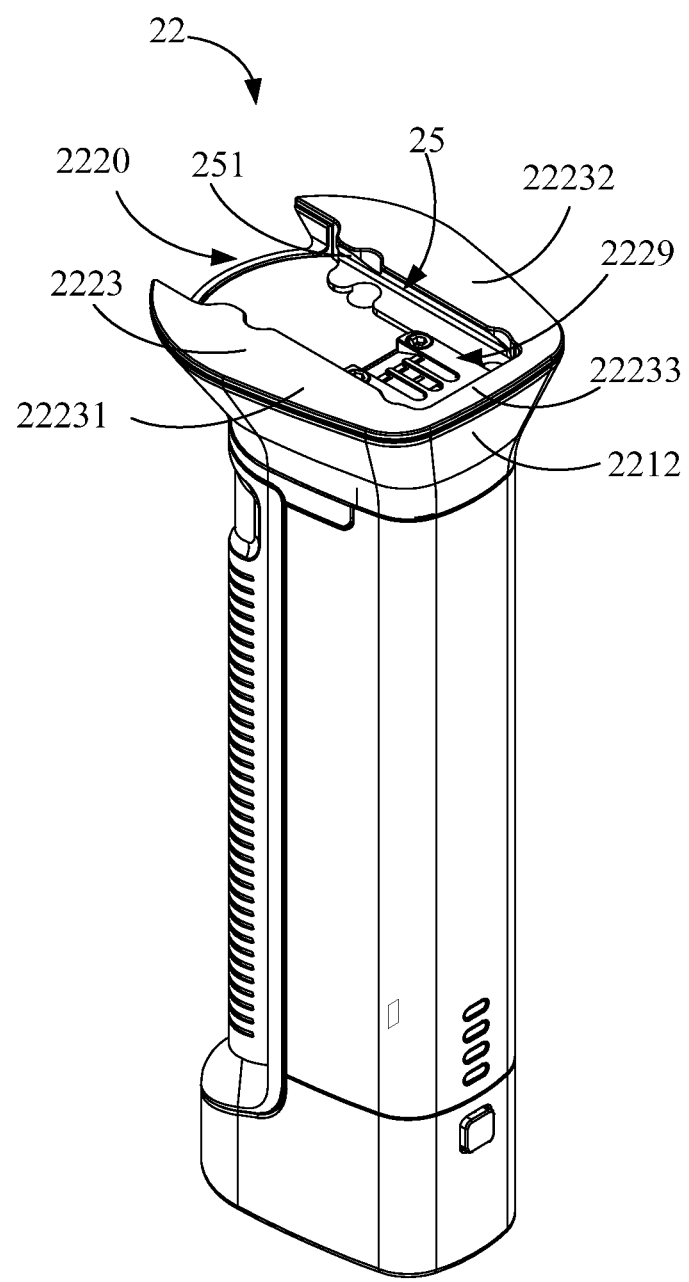
FIG. 15 is a schematic perspective view of a hand grip of the gimbal handle shown in FIG. 13.
Figure 16:
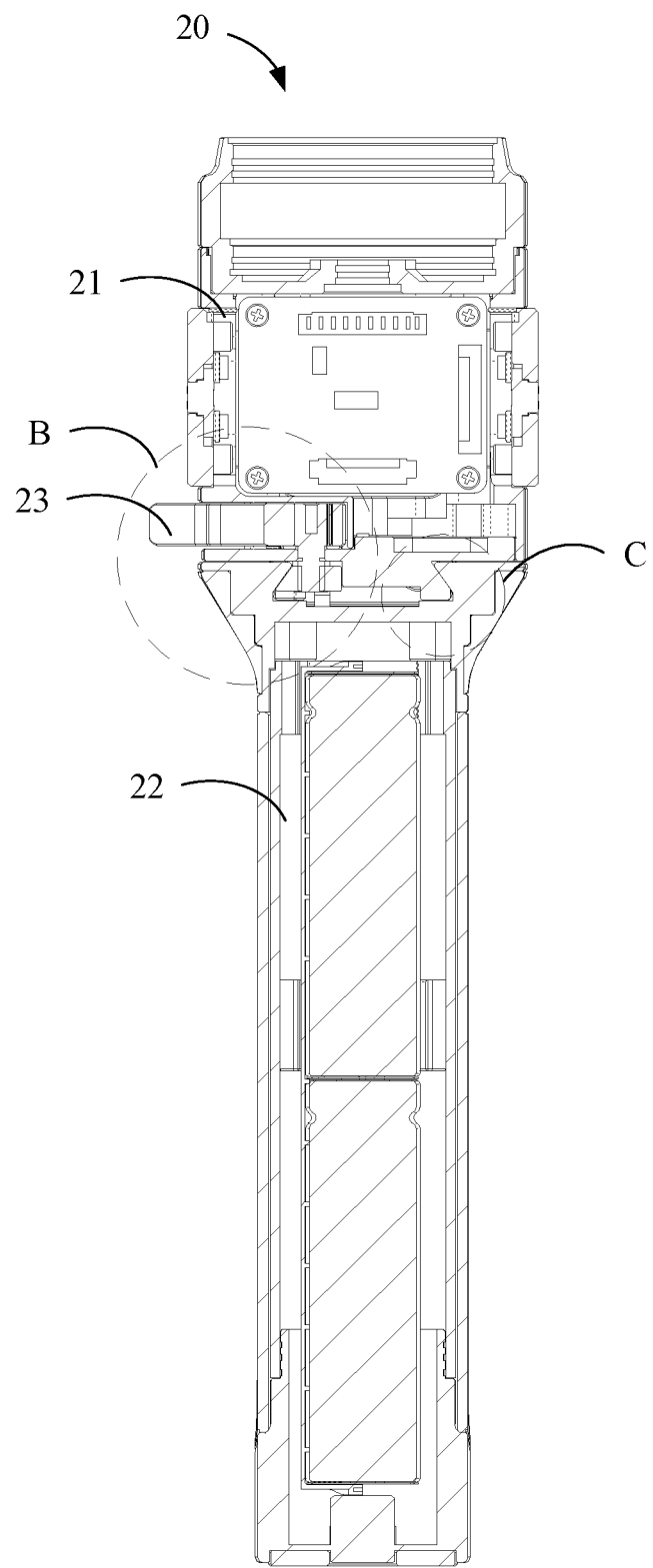
FIG. 16 is a longitudinal sectional view of the gimbal handle shown in FIG. 13, where the lock mechanism is not locked.
Figure 17:
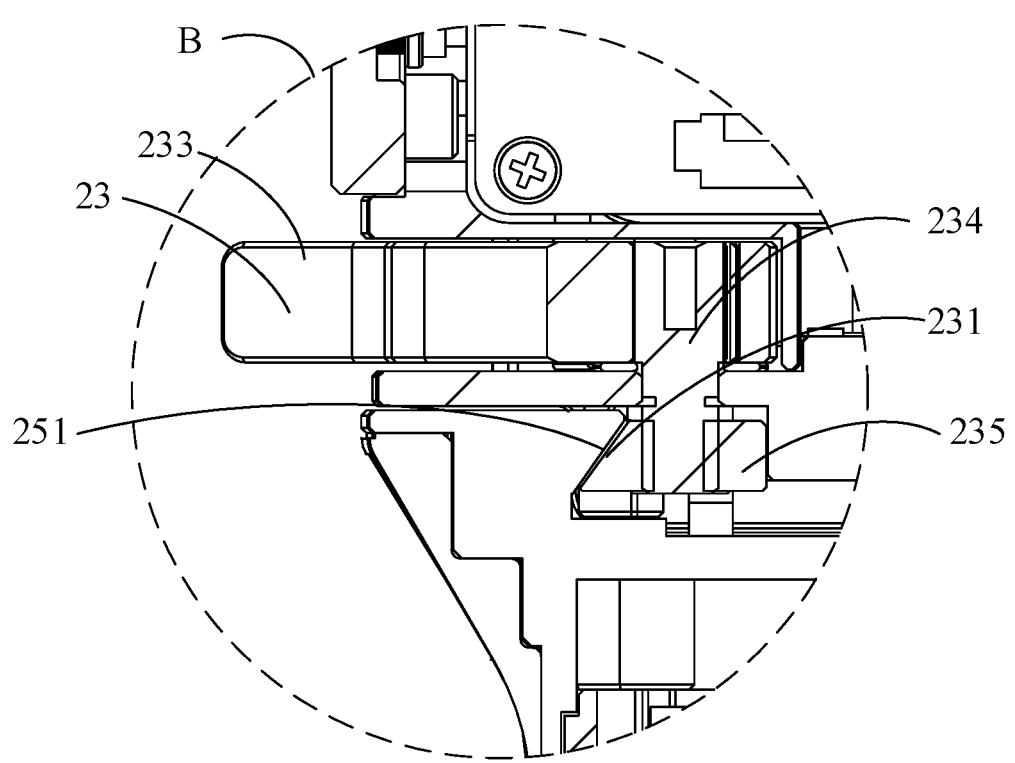
FIG. 17 is a partially enlarged view of the gimbal handle shown in FIG. 16.

FIG. 13 is a schematic perspective view of another embodiment of a gimbal handle 20, where the handle body 21 and the hand grip 22 of the gimbal handle 20 are separated. FIG. 14 is an exploded perspective view of the handle body 21 and the lock mechanism 23 of the gimbal handle 20 shown in FIG. 13. FIG. 15 is a schematic perspective view of the hand grip 22 of the gimbal handle 20 shown in FIG. 13. FIG. 16 is a longitudinal sectional view of the gimbal handle 20 shown in FIG. 13. FIG. 17 is a partially enlarged view of an area B of the gimbal handle 20 shown in FIG. 16. The gimbal handle 20 is similar to the gimbal handle 10 shown in FIGS. 5-13. The main differences of the gimbal handle 20 shown in FIG. 13-17 as compared with the gimbal handle 10 are as follows.

Referring to FIGS. 13-17, a lock mechanism 23 moves relative to a slot 25, so that a second abutment wall 231 moves up and down relative to a first abutment wall 251, so that the second abutment wall 231 abuts or separates against the first abutment wall 251. As shown in FIG. 14, in the illustrated embodiment, the lock mechanism 23 includes a wrench 233, a transmission member 234 connected to the wrench 233, and a movable compression block 235 connected to the transmission member 234. The moveable compression block 235 includes the second abutment wall 231. The wrench 233 and the transmission member 234 rotate to move the movable compression block 235 up and down.

In the embodiment shown in FIG. 14, the wrench 233 is formed with a wrench clamping tooth 2331 and the transmission member 234 is formed with a transmission clamping tooth 2341 that meshes with the wrench clamping tooth 2331. The wrench 233 rotates the transmission member 234 through the wrench clamping tooth 2331 and the transmission clamping tooth 2341. In the illustrated embodiment, a through hole 2332 is provided at one end of the wrench 233, and a wrench clamping tooth 2331 is formed in the through hole 2332. The wrench clamping tooth 2331 is formed at an inner wall of the through hole 2332. One end of the transmission member 234 is inserted into the through hole 2332. A transmission clamping too the 2341 is formed on the outside of the first end of the transmission member 234 inserted into the through hole 2332. The wrench clamping teeth 2331 and the transmission clamping teeth 2341 extend longitudinally and mesh with each other.

The second end of the transmission member 234 far from the transmission clamping tooth 2341 is inserted into the movable compression block 235. The second end is formed with an external thread (not shown in figures), and is flexibly connected with the movable compression block 235 through the external thread. A through hole is provided at the movable compression block 235, and an internal thread (not shown in figures) is provided at the through hole and meshes with the external thread formed at the second end.

Pulling the wrench 233 can drive the transmission member 234 to rotate, thereby driving the movable compression block 235 to move up and down, so that the second abutment wall 231 of the movable compression block 235 abuts or separate from the first abutment wall 251 of the slot 25. With the matching of the wrench clamping teeth 2331 and the transmission clamping teeth 2341, it is easier to design the movement range of the wrench 233 according to the desired movement range of the movable compression block 235, thereby determining the size of the operation groove 215.

In another embodiment, the wrench 233 and the transmission member 234 are fixedly connected. The transmission member 234 rotates together with the wrench 233. In one embodiment, the wrench 233 and the transmission member 234 may be integrally formed.

In the embodiment shown in FIGS. 13 and 14, the lock mechanism 23 is mounted at the handle body 21, and the slot 25 is formed at the hand grip 22. The handle body 21 includes an operation portion 217 and a bottom plate 218 fixedly assembled at the bottom of the operation portion 217. The operation portion 217 can be mounted with a gimbal, and is provided with an operation member, a control chip, a conductive terminal, and the like. The wrench 233 is installed between the operation portion 217 and the bottom plate 218 and can be rotated relative to the bottom plate 218. The transmission member 234 is connected to the wrench 233 above the bottom plate 218, passes through the bottom plate 218 from the top of the bottom plate 218, and is connected to the movable compression block 235 located below the bottom plate 218. A washer 219 may be provided between the transmission member 234 and the top surface of the bottom plate 218, and the washer 219 may have a circular ring shape to reduce friction between the transmission member 234 and the bottom plate 218.

In the embodiment shown in FIG. 14, the bottom surface of the bottom plate 218 is convexly provided with an engagement portion 214. The engagement portion 214 matches with the slot 25 and can be inserted into the slot 25. The engagement portion 214 is basically disposed symmetrically with respect to the axis of the bottom plate 218. One side of the engagement portions 214 is provided with a notch 2141, and the movable compression block 235 is located in the notch 2141 and moves up and down in the notch 2141. In the illustrated embodiment, the engagement portions 214 are located at the middle positions of the left and right sides of the bottom plate 218 and extend in the front and rear directions. The outward sidewalls of the engagement portions 214 are inclined with respect to the bottom surface of the bottom plate 218. In the illustrated embodiment, the movable compression block 235 is a substantially rectangular block, and an inclined second abutment wall 231 is formed on one side. The second abutment wall 231 coincides with the inclined sidewall of the engagement portion 214 on the side, where the notch 2141 is formed, with a consistent inclination angle and same facing direction.

In the embodiment shown in FIG. 15, a protrusion 2223 is formed on the top of the hand grip 22, and the protrusion 2223 includes a left section 22231, a right section 22232, and a front section 22233, which surround to form an opening 2220. The left section 22231, the right section 22232, and the front section 22233 form a groove 2229 on the top of the hand grip 22, and the opposite sidewalls of the left section 22231 and the right section 22232 are recessed to form a slot 25. The protrusion 2223 may be provided in the same manner as the protrusion 1223 in the foregoing embodiment. In another embodiment, the sidewall of protrusion 2223 may also be smoothly connected to the sidewall of the connection portion 2212 of the hand grip 22. In another embodiment, the slot 25 is provided at the handle body 21, the protrusion 2223 is convexly provided at the bottom surface of the bottom plate 218 of the handle body 21, and the engagement portion 214 is formed at the top surface of the hand grip 22.

Figure 18:
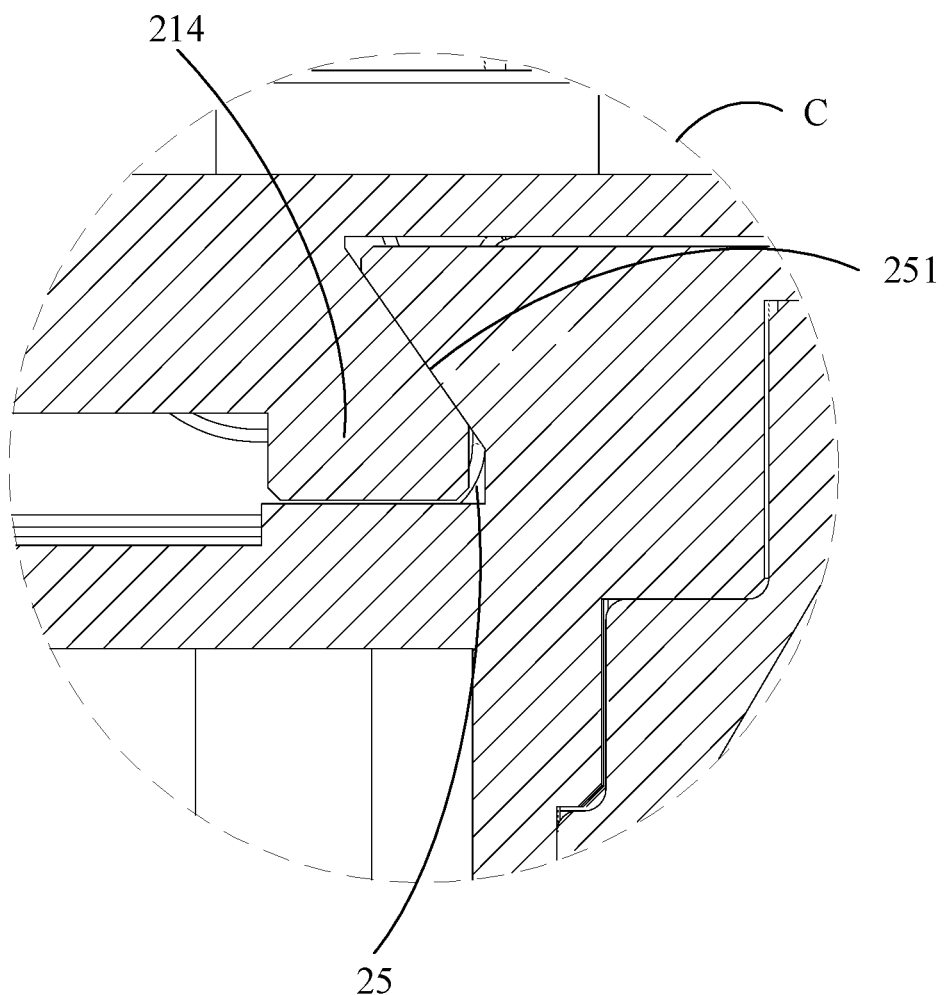
FIG. 18 is another partially enlarged view of the gimbal handle shown in FIG. 16.

FIG. 18 is an enlarged view of a partial area C of the gimbal handle 20 shown in FIG. 13. When the lock mechanism 23 is not locked, the engagement portion 214 and the slot 25 are loosened, and there is a gap between the bottom surface of the slot 25 and the bottom surface of the engagement portion 214. The first abutment wall 251 of the slot 25 and the opposite sidewall of the engagement portion 214 can be abutted together, and the engagement portion 214 can slide along the first abutment wall 251 of the slot 25 and be inserted into the slot 25 or drawn out from the slot 25. The hand grip 22 and the handle body 21 can be connected by sliding from the front and rear directions, and the hand grip 22 and the handle body 21 can be separated by sliding from the front and rear directions.

Figure 19:
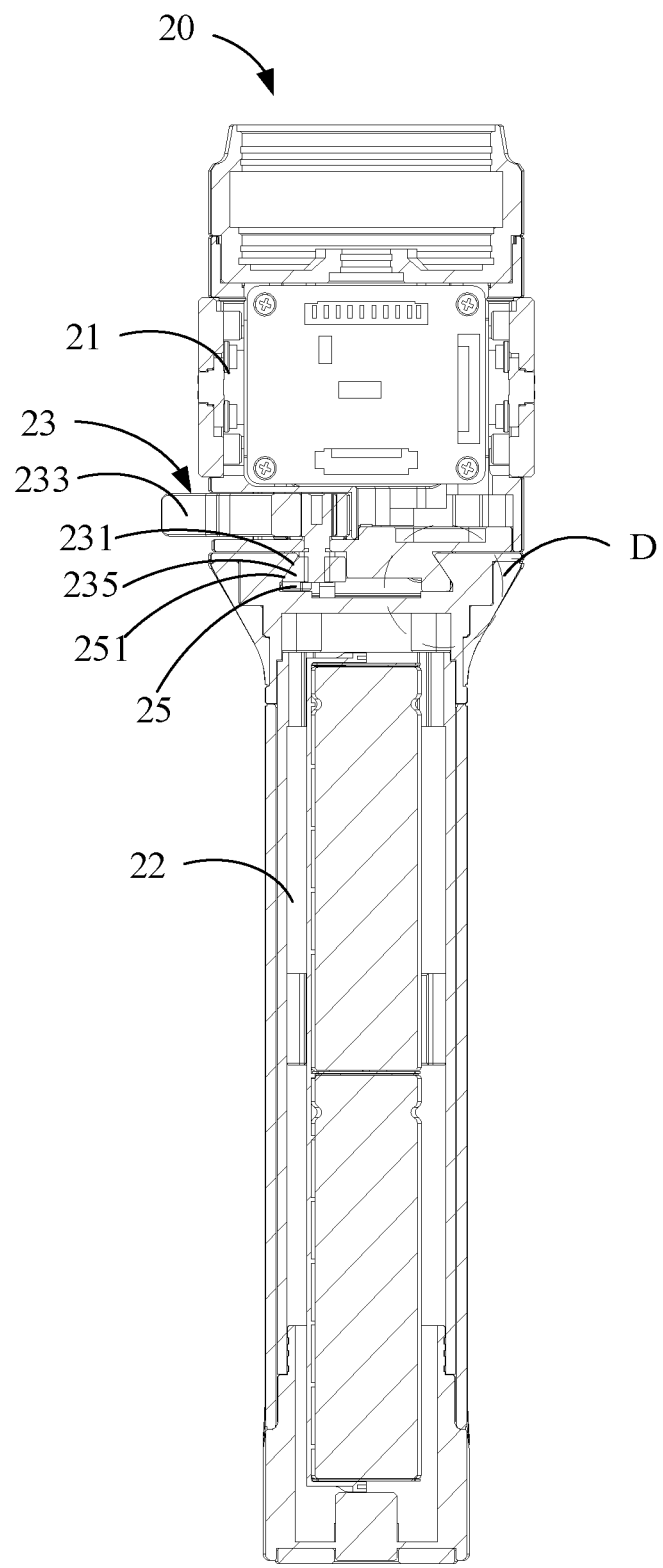
FIG. 19 is a longitudinal sectional view of the gimbal handle shown in FIG. 13, where the lock mechanism is locked.
Figure 20:
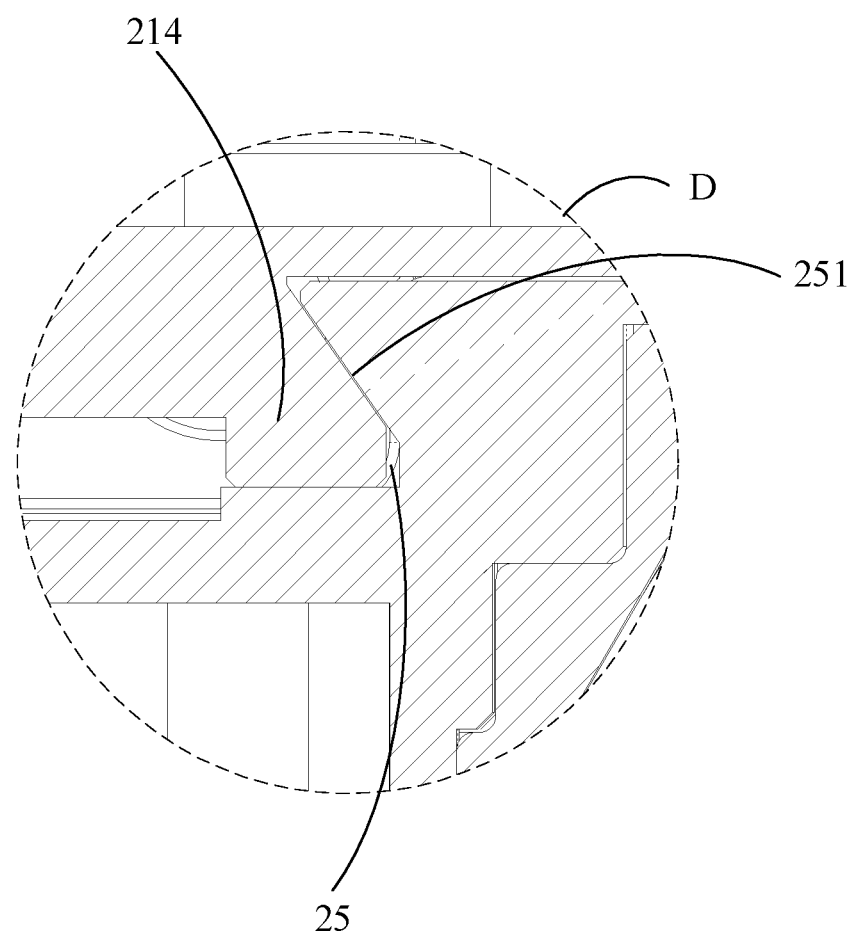
FIG. 20 is a partially enlarged view of the gimbal handle shown in FIG. 19.

FIG. 19 is a longitudinal sectional view of the gimbal handle 20 when it is locked. FIG. 20 is an enlarged view of a partial area D of the gimbal handle 20 shown in FIG. 19. When the lock mechanism 23 is locked, turning the wrench 233 drives the transmission member 234 to rotate, so that the movable compression block 235 moves upward. In the illustrated embodiment, the wrench 233 is turned clockwise, that is, the wrench 233 is pulled toward the rear side of the gimbal handle 20. The movable compression block 235 is abutted in the slot 25, the second abutment wall 231 abuts the first abutment wall 251, and the hand grip 22 abuts upward against the handle body 21. In this way, the hand grip 22 and the handle body 21 are abutted against each other, and the hand grip 22 and the handle body 21 are locked together. At this time, the transmission member 234 is screwed into the movable compression block 235 to realize reverse self-locking.

In the illustrated embodiment, turning the wrench 233 counterclockwise, that is, pulling the wrench 233 forward, drives the transmission member 234 to rotate in the reverse direction, and moves the movable compression block 235 downward. As a result, the second abutment wall 231 is separated from the first abutment wall 251 and the lock mechanism 23 is unlocked, so that the hand grip 22 and the handle body 21 can be disassembled in the state of FIG. 14.

In the present disclosure, relational terms such as "first" and "second" are only used to distinguish one entity or operation from another entity or operation, and do not necessarily require or imply that there is any such actual relationship or order between these entities or operations. The term "comprising," "including" or any other variation thereof is non-exclusive inclusion, such that a process, method, article, or device that include a series of elements include not only those elements but also other elements that are not explicitly listed, or elements that are inherent to such a process, method, article, or device. Without more restrictions, the elements associated with the sentence "including a . . . " do not exclude the existence of other identical elements in the process, method, article, or equipment that includes the elements.

The methods and devices provided by the present disclosure are described in detail above. Specific examples are used to explain the principles and implementation of the present disclosure. The descriptions of the above embodiments are only for facilitating the understanding of the present disclosure; meanwhile, for a person of ordinary skill in the art, according to the present disclosure, there will be changes in the specific implementation and application. In summary, the content of this specification is not a limitation to this disclosure.

The content disclosed in this disclosure contains material which is subject to copyright protection. The copyright is owned by the copyright owner. The copyright owner has no objection to the facsimile reproduction by anyone of the patent document or the patent disclosure as it appears in the official records and archives of the Patent and Trademark Office.

What is claimed is:

1. A handheld gimbal device comprising:
a gimbal; and
a gimbal handle connected to the gimbal and including:
a handle body including an external interface configured to be connected between the gimbal and an external device; and
a hand grip detachably mounted at the handle body.

2. The handheld gimbal device of claim 1, wherein the external interface is configured to connect with at least one of a focus follower, a secondary handle, a U disk, a display screen, or a microphone.

3. The handheld gimbal device of claim 1, wherein the external interface is configured to connect with a focus follower, and the focus follower includes a display screen for displaying parameters of the gimbal and a control button for adjusting the parameters of the gimbal.

4. The handheld gimbal device of claim 1, wherein the hand grip is configured to supply power to the gimbal.

5. The handheld gimbal device of claim 1, wherein:
one of the handle body and the hand grip includes a slot;
another one of the handle body and the hand grip includes a lock mechanism configured to at least partially reach into the slot when the handle body and the hand grip are assembled together;
the slot includes a first abutment wall extending obliquely with respect to a bottom surface of the slot;
the lock mechanism includes a second abutment wall that extends obliquely with respect to the bottom surface of the slot; and
the lock mechanism is configured to move relative to the slot to cause the first abutment wall abut against or separate from the second abutment wall, to assemble or disassemble the handle body and hand grip.

6. The handheld gimbal device of claim 5, wherein:
the lock mechanism includes a lock cam and a wrench connected to the lock cam; and
the second abutment wall includes at least a part of a sidewall of the lock cam.

7. The handheld gimbal device of claim 6, wherein the lock cam includes an eccentric wheel.

8. The handheld gimbal device of claim 7, wherein a sidewall of the eccentric wheel extends obliquely with respect to a bottom surface of the eccentric wheel.

9. The handheld gimbal device of claim 8, wherein a compression block is disposed at a side of the eccentric wheel, and the compression block includes the second abutment wall.

10. The handheld gimbal device of claim 6, wherein the lock mechanism includes a shaft member configured to pass through the lock cam to mount the lock cam to the other one of the handle body and the hand grip.

11. The handheld gimbal device of claim 6, wherein the lock cam and the wrench are integrally formed.

12. The handheld gimbal device of claim 5, wherein the lock mechanism is configured to move relative to the slot to cause the second abutment wall to move up and down relative to the first abutment wall.

13. The handheld gimbal device of claim 12, wherein:
the lock mechanism includes a wrench, a transmission member connected to the wrench, and a movable compression block connected to the transmission member;
the moveable compression block includes the second abutment wall; and
the wrench and the transmission member are configured to rotate to move the movable compression block up and down.

14. The handheld gimbal device of claim 13, wherein:
the wrench includes a wrench clamping tooth;
the transmission member includes a transmission clamping tooth that meshes with the wrench clamping tooth, and
the wrench is configured to rotate the transmission member through the wrench clamping tooth and the transmission clamping tooth.

15. The handheld gimbal device of claim 14, wherein:
a through hole is provided at one end of the wrench;
the wrench clamping tooth is formed in the through hole; and
one end of the transmission member is inserted in the through hole.

16. The handheld gimbal device of claim 13, wherein one end of the transmission member far from the wrench is formed with threads and is flexibly connected with the movable compression block through the threads.

17. The handheld gimbal device of claim 13, wherein the wrench and the transmission member are fixedly connected.

18. The handheld gimbal device of claim 1, wherein the external interface is configured to be directly electrically connected to a connection interface of the external device to connect the gimbal to the external device.

19. The handheld gimbal device of claim 1, wherein the handle body further includes a fixation hole provided at upper or lower side of the external interface to fix the external device at the handle body.

20. The handheld gimbal device of claim 1, wherein a lower end of the handle body is provided with an interface matching a battery in the hand grip.

* * * * *